US012739723B2

(12) United States Patent
Lim et al.

(10) Patent No.: US 12,739,723 B2
(45) Date of Patent: Sep. 15, 2026

(54) ELECTRONIC DEVICE PERFORMING HANDOVER AND OPERATION METHOD THEREOF

(71) Applicant: Samsung Electronics Co., Ltd., Suwon-si (KR)

(72) Inventors: Yongtae Lim, Suwon-si (KR); Keonyoung Lee, Suwon-si (KR); Hyeonsoo Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 311 days.

(21) Appl. No.: 18/531,941

(22) Filed: Dec. 7, 2023

(65) Prior Publication Data

US 2024/0121689 A1 Apr. 11, 2024

Related U.S. Application Data

(63) Continuation of application No. PCT/KR2022/005619, filed on Apr. 19, 2022.

(30) Foreign Application Priority Data

Jun. 7, 2021 (KR) ........................ 10-2021-0073389

(51) Int. Cl.
*H04W 36/30* (2009.01)
*H04W 36/00* (2009.01)
(Continued)

(52) U.S. Cl.
CPC ..... *H04W 36/305* (2018.08); *H04W 36/0058* (2018.08); *H04W 36/08* (2013.01); *H04W 36/302* (2023.05); *H04W 76/20* (2018.02)

(58) Field of Classification Search
CPC ............. H04W 36/305; H04W 36/302; H04W 36/008375; H04W 76/20; H04W 36/0085;
(Continued)

(56) References Cited

U.S. PATENT DOCUMENTS 8,559,397 B2 * 10/2013 Huang .................. H04W 76/19 370/332
9,258,747 B2 * 2/2016 Sivanesan ......... H04W 36/0016
(Continued)

FOREIGN PATENT DOCUMENTS

EP 4106400 12/2022
KR 20150014769 A 2/2015
(Continued)

OTHER PUBLICATIONS

Extended European Search Report dated Sep. 18, 2024 issued in European Patent Application No. 22820398.0.
(Continued)

*Primary Examiner* — Bailor C Hsu
(74) *Attorney, Agent, or Firm* — NIXON & VANDERHYE P.C.

(57) ABSTRACT

According to various embodiments, an electronic device comprises: memory storing instructions and at least one processor. The instructions, when executed by at least one processor, may cause the electronic device to: receive at least one radio resource control (RRC) reconfiguration message from a serving cell; perform measurement for at least one neighboring cell based on information associated with conditional reconfiguration confirmed on the basis of the at least one RRC reconfiguration message; and perform at least one procedure for handover to a target cell satisfying a specified condition, based on which a radio link failure with the serving cell is detected and at least a part of the measurement result for the at least one neighboring cell satisfies the specified condition confirmed based on the information associated with the conditional reconfiguration.

18 Claims, 25 Drawing Sheets

(51) Int. Cl.
*H04W 36/08* (2009.01)
*H04W 76/20* (2018.01)

(58) Field of Classification Search
CPC ....... H04W 36/00835; H04W 36/0058; H04W 36/087; H04W 36/362; H04W 36/249; H04W 36/08
See application file for complete search history.

(56) References Cited

U.S. PATENT DOCUMENTS

| | | | | |
|---|---|---|---|---|
| 9,693,268 | B2 * | 6/2017 | Park | H04W 24/10 |
| 9,924,419 | B2 * | 3/2018 | Moon | H04W 76/18 |
| 9,942,807 | B2 * | 4/2018 | Zhu | H04W 36/305 |
| 11,564,141 | B2 * | 1/2023 | Paladugu | H04W 36/0016 |
| 2014/0133465 | A1 | 5/2014 | Johansson et al. | |
| 2014/0301360 | A1 * | 10/2014 | Bontu | H04W 36/0061 370/331 |
| 2015/0139113 | A1 * | 5/2015 | You | H04L 5/003 370/329 |
| 2016/0302127 | A1 | 10/2016 | Moon et al. | |
| 2019/0141771 | A1 | 5/2019 | Ma et al. | |
| 2019/0150050 | A1 * | 5/2019 | Kinthada Venkata | H04W 36/302 370/334 |
| 2020/0351694 | A1 * | 11/2020 | Chen | H04W 36/362 |
| 2021/0022055 | A1 * | 1/2021 | Tseng | H04W 36/362 |
| 2021/0029600 | A1 | 1/2021 | Balan et al. | |
| 2021/0051554 | A1 | 2/2021 | Paladugu et al. | |
| 2021/0360495 | A1 * | 11/2021 | Lovlekar | H04W 36/305 |
| 2023/0008394 | A1 * | 1/2023 | Wegmann | H04W 36/0058 |

FOREIGN PATENT DOCUMENTS

| | | | |
|---|---|---|---|
| KR | 20150039068 | A | 4/2015 |
| KR | 20150140203 | A | 12/2015 |
| KR | 20190087299 | A | 7/2019 |
| KR | 20190119133 | A | 10/2019 |
| KR | 20210051835 | A | 5/2021 |
| WO | 2015140848 | A1 | 9/2015 |
| WO | 2020/034807 | | 2/2020 |
| WO | 2021/029713 | | 2/2021 |
| WO | 2021/088077 | | 5/2021 |

OTHER PUBLICATIONS

International Search Report for PCT/KR2022/005619 mailed Jul. 6, 2022, 5 pages.
Written Opinion of the ISA for PCT/KR2022/005619 mailed Jul. 6, 2022, 5 pages.
Ericsson. [Postl 13-e][85I][NR17 SON/MDT] HO related SON changes (Ericsson). R2-2103945, 3 GPP TSG RAN WG2 #I 13b-e. Apr. 1, 2021, 78 pages.
Hua Wei et al. Discussion on handover related SON aspects. R2-2103731, 3GPP TSG RAN WG2 #113b-e. Apr. 2, 2021, 28 pages.
3GPP TS 38.331 v16.4.1. (Mar. 2021), Technical Specification, 3rd Generation Partnership Project; Technical Specification Group Radio Access Network; NR; Radio Resource Control (RRC) protocol specification (Release 16), 951 pages.
3GPP TSG-RAN WG2 #113bis-e, Tdoc R2-2103944, Electronic meeting, Apr. 12-20, 2021, Handover-related SON aspects, 14 pages.

* cited by examiner

ELECTRONIC DEVICE PERFORMING HANDOVER AND OPERATION METHOD THEREOF

CROSS-REFERENCE TO RELATED APPLICATIONS

This application is a continuation of International Application No. PCT/KR2022/005619 designating the United States, filed on Apr. 19, 2022, in the Korean Intellectual Property Receiving Office and claiming priority to Korean Patent Application No. 10-2021-0073389, filed on Jun. 7, 2021, in the Korean Intellectual Property Office, the disclosures of each of which are incorporated by reference herein in their entireties.

BACKGROUND

Field

The disclosure relates to an electronic device for performing handover and an operating method thereof.

Description of Related Art

A network may configure a user equipment (UE) based on one or more candidate target cells (e.g., SpCell) in a conditional reconfiguration. For example, the UE may evaluate conditions of each of configured candidate target cells. The user equipment may apply a conditional reconfiguration associated with one of target cells satisfying an execution condition. In Release 16 of the 3rd Generation Partnership Project (3GPP), the network may provide configuration parameters for a target SpCell to an IE of ConditionalReconfiguration.

In the conditional reconfiguration, the function of a conditional handover (CHO) has been provided. A network supporting the conditional handover function may transmit a message including information about a candidate target cell for handover and a handover execution condition to the user equipment. The user equipment may perform a handover procedure for a candidate target cell when the handover execution condition is satisfied.

A user equipment supporting the conditional handover function may receive a message including information about a candidate target cell for handover and a handover execution condition from the network. In case that it is identified that the handover execution condition is satisfied, the UE may perform a handover procedure for the corresponding target cell. For example, when it is identified that A3 event or A5 event is satisfied during a time to trigger (TTT), the UE may perform a handover procedure based on a conditional reconfiguration. The TTT may be a period in which a specific event should be satisfied. In case that a specific event is not satisfied during the TTT, the UE may not perform a handover procedure based on the conditional reconfiguration.

As described above, in case that a specific event is satisfied but not maintained during the TTT, the UE may not perform a handover procedure based on conditional reconfiguration. On the other hand, there is a possibility that a radio link failure (RLF) occurs when a specific event is identified to be satisfied and before the TTT expires. The UE may be configured to, in case that the RLF has occurred, perform at least one of performance of an RRC re-establishment procedure, transmission of master cell group (MCG) failure information, or transmission of secondary cell group (SCG) failure information. Accordingly, even when the handover procedure has a high probability of success, the time required for reconnection to the network may increase as the UE performs the procedure according to the occurrence of the RLF.

SUMMARY

Embodiments of the disclosure provide an electronic device and an operating method thereof that may, in the case of RLF occurrence, if a measurement result for a specific cell satisfies a condition identified based on conditional reconfiguration information, perform handover based on conditional reconfiguration to the specific cell.

According to various example embodiments, an electronic device may include: memory storing instructions and at least one processor, wherein the instructions, that when executed by at least one processor, cause the electronic device to: receive at least one radio resource control (RRC) reconfiguration message from a serving cell, perform measurement for at least one neighboring cell based on information associated with conditional reconfiguration identified based on the at least one RRC reconfiguration message, and perform, based on a radio link failure with the PSCell being detected and at least some of the measurement results for the at least one neighboring cell satisfying a designated condition identified based on the information associated with the conditional reconfiguration, at least one procedure for handover to a target cell satisfying the designated condition.

According to various example embodiments, an electronic device may include: memory storing instructions and at least one processor, wherein the instructions, that when executed by at least one processor, cause the electronic device to: based on being connected to a serving cell of a first radio access technology (RAT) and a PSCell of a second RAT different from the first RAT, receive at least one radio resource control (RRC) reconfiguration message from the serving cell, perform measurement for at least one neighboring cell based on information associated with conditional reconfiguration identified based on the at least one RRC reconfiguration message, and perform, based on a radio link failure with the PSCell being detected and at least some of the measurement results for the at least one neighboring cell satisfying a designated condition identified based on the information associated with the conditional reconfiguration, at least one procedure for handover to a target cell satisfying the designated condition.

According to various example embodiments, an electronic device may include: memory storing instructions and at least one processor, wherein the instructions, that when executed by at least one processor, cause the electronic device to: receive at least one radio resource control (RRC) reconfiguration message from a serving cell, perform measurement for at least one neighboring cell based on information associated with conditional reconfiguration identified based on the at least one RRC reconfiguration message, identify that a first measurement result for a target cell among the measurement results for the at least one neighboring cell satisfies an entering execution condition identified based on the information associated with the conditional reconfiguration, identify that, before the elapse of a time to trigger, identified based on the information associated with the conditional reconfiguration, at least one second measurement result after the first measurement result fails to satisfy a leaving execution condition identified based on the information associated with the conditional reconfiguration, detect a radio link failure to the serving cell before the time to trigger elapses, identify at least one third measurement result while deferring performance of an operation corresponding to the radio link failure until the time to trigger has elapsed from the time point of measurement of the first measurement result, perform at least one procedure for handover to the target cell based on the at least one third measurement result failing to satisfy the leaving execution condition, and perform an operation corresponding to the radio link failure, based on at least a part of the at least one third measurement result satisfying the leaving execution condition.

According to an example embodiment, a method of operating an electronic device comprise: receiving at least one radio resource control (RRC) reconfiguration message from a serving cell, performing measurement for at least one neighboring cell based on information associated with a conditional reconfiguration identified based on the at least one RRC reconfiguration message, and performing, based on a radio link failure with the serving cell being detected and at least part of measurement result for the at least one neighboring cell satisfying a designated condition identified based on the information associated with the conditional reconfiguration, at least one procedure for handover to a target cell satisfying the designated condition.

According to an example embodiment, a computer-readable storage medium storing instructions, wherein the instructions, when executed by at least one processor of an electronic device, cause the electronic device to perform operations comprising: receiving at least one radio resource control (RRC) reconfiguration message from a serving cell, performing measurement for at least one neighboring cell based on information associated with a conditional reconfiguration identified based on the at least one RRC reconfiguration message, and performing, based on a radio link failure with the serving cell being detected and at least part of measurement result for the at least one neighboring cell satisfying a designated condition identified based on the information associated with the conditional reconfiguration, at least one procedure for handover to a target cell satisfying the designated condition.

According to various example embodiments, there may be provided an electronic device and an operation method thereof that are capable of, in a case of occurrence of an RLF, if a measurement result for a specific cell satisfies a condition identified based on conditional reconfiguration information, performing handover based on conditional reconfiguration to the specific cell. Accordingly, a reconnection time in the case of RLF occurrence can be shortened.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
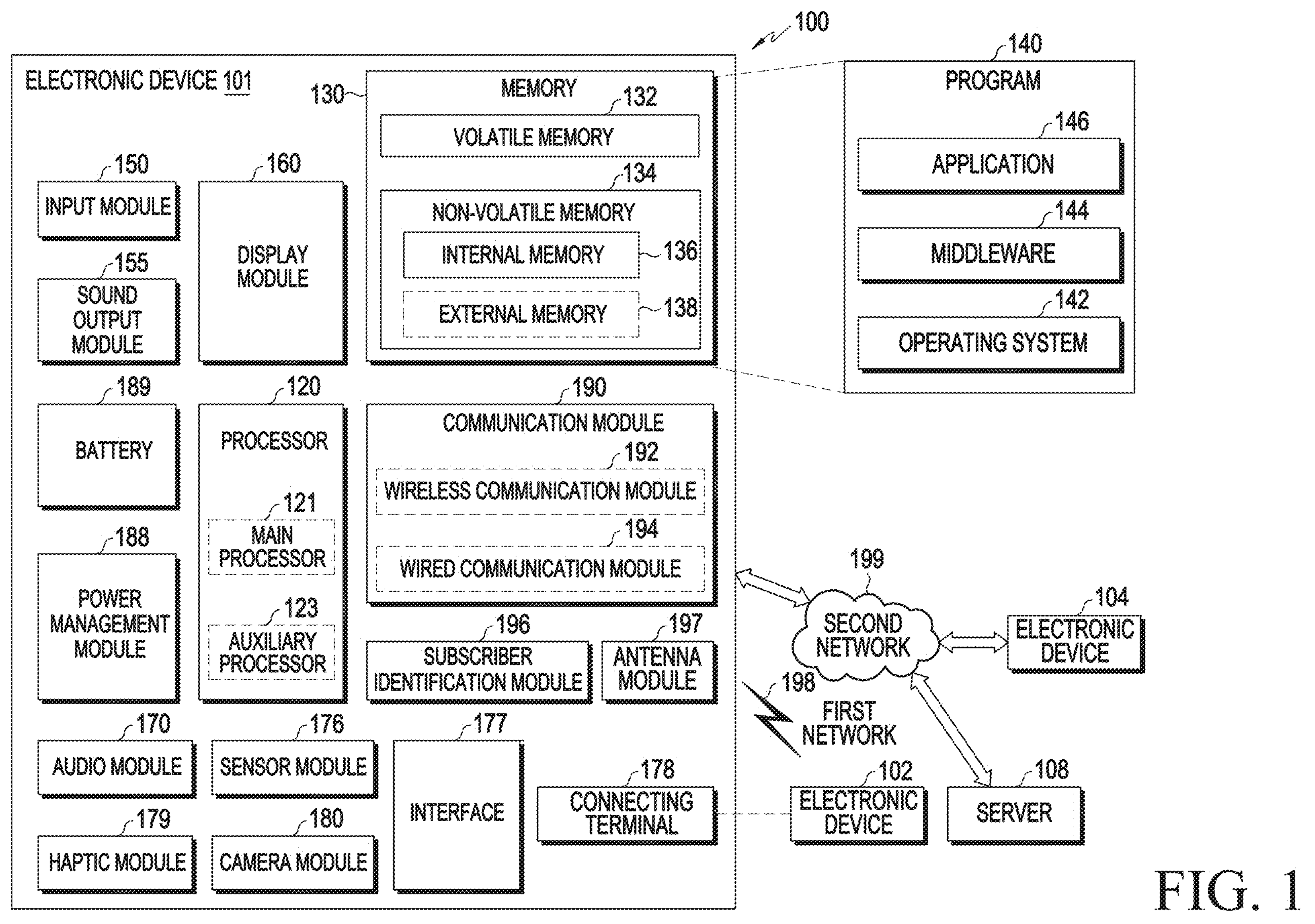
FIG. 1 is a block diagram of illustrating an example electronic device in a network environment according to various embodiments.

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may include various processing circuitry (as used herein, including the claims, the term "processor" may include various processing circuitry, including at least one processor, wherein one or more processors of at least one processor may be configured to perform the various functions described herein) and may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
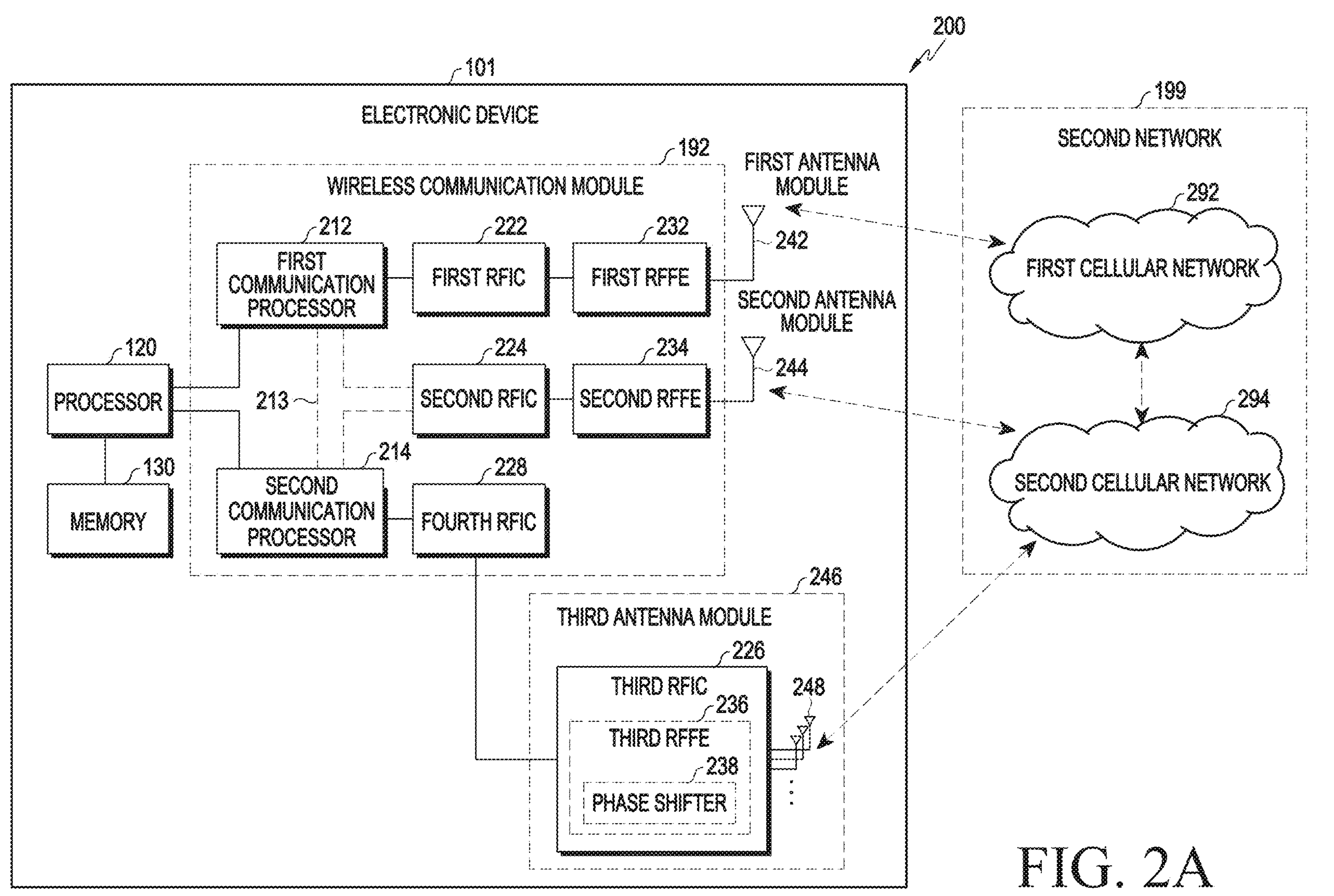
FIG. 2A is a block diagram illustrating an example configuration of an electronic device for supporting legacy network communication and 5G network communication according to various embodiments.

FIG. 2A is a block diagram 200 illustrating an example configuration of an electronic device 101 for supporting legacy network communication and 5G network communication according to various embodiments. Referring to FIG. 2, the electronic device 101 may include a first communication processor (e.g., including processing circuitry) 212, a second communication processor (e.g., including processing circuitry) 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, a third antenna module 246, and antennas 248. The electronic device 101 may further include a processor (e.g., including processing circuitry) 120 and memory 130. The second network 199 may include a first cellular network 292 and a second cellular network 294. According to an embodiment, the electronic device 101 may further include at least one component of the components illustrated in FIG. 1, and the second network 199 may further include at least another network. According to an embodiment, the first communication processor 212, the second communication processor 214, the first RFIC 222, the second RFIC 224, the fourth RFIC 228, the first RFFE 232, and the second RFFE 234 may form at least a part of the wireless communication module 192. According to an embodiment, the fourth RFIC 228 may be omitted or may be included as a part of the third RFIC 226.

The first communication processor 212 may include various processing circuitry (as used herein, including the claims, the term "processor" may include various processing circuitry, including at least one processor, wherein one or more processors of the at least one processor may be configured to perform the various functions described herein) and support the establishment of a communication channel of a band to be used for wireless communication with the first cellular network 292 and the legacy network communication through the established communication channel. According to various embodiments, the first cellular network may be a legacy network including 2nd-generation (2G), 3G, 4G, and/or long term evolution (LTE) network. The second communication processor 214 may include various processing circuitry (as used herein, including the claims, the term "processor" may include various processing circuitry, including at least one processor, wherein one or more processors of the at least one processor may be configured to perform the various functions described herein) and may support the establishment of a communication channel corresponding to a designated band (e.g., about 6 GHz to about 60 GHz) among bands to be used for wireless communication with the second cellular network 294 and 5G network communication via the established communication channel. According to various embodiments, the second cellular network 294 may be a 5G network defined in the 3GPP. Additionally, according to an embodiment, the first communication processor 212 or the second communication processor 214 may support the establishment of a communication channel corresponding to another designated band (e.g., about 6 GHz or less) among bands to be used for wireless communication with the second cellular network 294 and 5G network communication via the established communication channel.

The first communication processor 212 may transmit or receive data to or from the second communication processor 214. For example, data classified as transmittable through the second cellular network 294 may be changed to be transmitted through the first cellular network 292. In this case, the first communication processor 212 may receive transmission data from the second communication processor 214. For example, the first communication processor 212 may transmit or receive data through the second communication processor 214 and an inter-processor interface 213. The inter-processor interface 213 may be implemented as, for example, a universal asynchronous receiver/transmitter (UART) (e.g., HS-high speed-UART (HS-UART) or a peripheral component interconnect bus express (PCIe) interface), but there are no restrictions on the type thereof. Alternatively, the first communication processor 212 and the second communication processor 214 may exchange control information and packet data information using, for example, shared memory. The first communication processor 212 may transmit or receive various types of information such as sensing information, information on output strength, and resource block (RB) allocation information to or from the second communication processor 214.

Depending on the implementation, the first communications processor 212 may not be directly connected to the second communications processor 214. In this case, the first communication processor 212 may transmit or receive data to or from the second communication processor 214 through the processor 120 (e.g., an application processor). For example, the first communication processor 212 and the second communication processor 214 may transmit or receive data to or from the processor 120 (e.g., application processor) through the HS-UART interface or PCIe interface, but there are no restrictions on the type of interface. Alternatively, the first communication processor 212 and the second communication processor 214 may exchange control information and packet data information using shared memory with the processor 120 (e.g., an application processor).

Figure 2B:
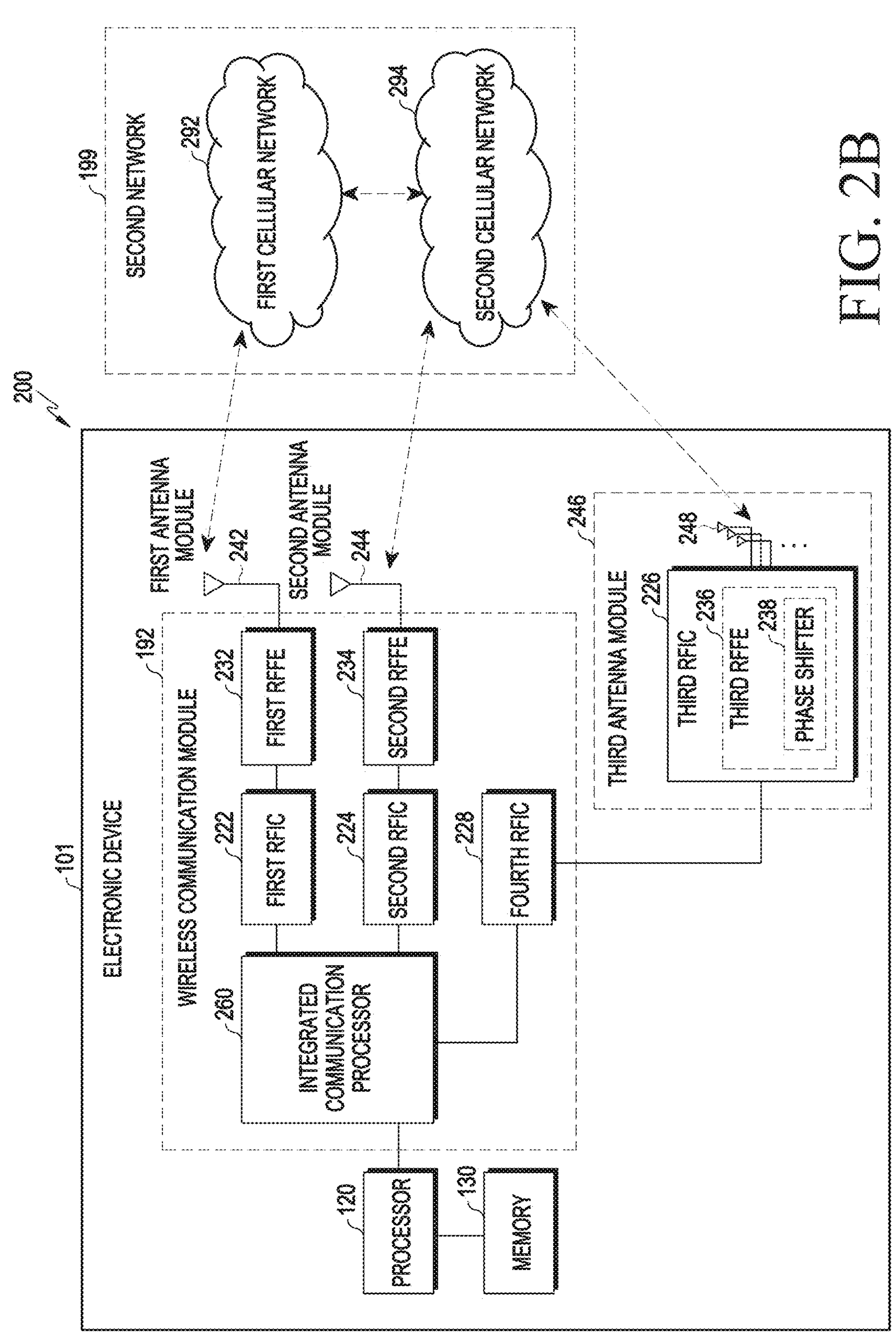
FIG. 2B is a block diagram illustrating an example configuration of an electronic device for supporting legacy network communication and 5G network communication according to various embodiments.

According to an embodiment, the first communication processor 212 and the second communication processor 214 may be implemented within a single chip or a single package. According to various embodiments, the first communication processor 212 or the second communication processor 214 may be formed within a single chip or a single package with the processor 120, the auxiliary processor 123, or the communication module 190. For example, as shown in FIG. 2B, the unified communications processor (e.g., including processing circuitry) 260 may support functions for communication with both the first cellular network 292 and the second cellular network 294. The unified processor 260 may include various processing circuitry (as used herein, including the claims, the term "processor" may include various processing circuitry, including at least one processor, wherein one or more processors of the at least one processor may be configured to perform the various functions described herein).

In the case of transmitting a signal, the first RFIC 222 may convert a baseband signal generated by the first communication processor 212 into a radio frequency (RF) signal of approximately 700 MHz to approximately 3 GHz that is used in the first cellular network 292 (e.g., a legacy network). In the case of receiving a signal, an RF signal may be obtained from the first cellular network 292 (e.g., a legacy network) through an antenna (e.g., the first antenna module 242) and may be pre-processed through an RFFE (e.g., the first RFFE 232). The first RFIC 222 may convert the preprocessed RF signal into a baseband signal so as to be processed by the first communication processor 212.

In the case of transmitting a signal, the second RFIC 224 may convert a baseband signal generated by the first communication processor 212 or the second communication processor 214 into an RF signal (hereinafter referred to as a "5G Sub6 RF signal") in a Sub6 band (e.g., approximately 6 GHz or lower) used in the second cellular network 294 (e.g., a 5G network). In the case of receiving a signal, a 5G Sub6 RF signal may be obtained from the second cellular network 294 (e.g., a 5G network) through an antenna (e.g., the second antenna module 244) and may be pre-processed through an RFFE (e.g., the second RFFE 234). The second RFIC 224 may convert the pre-processed 5G Sub6 RF signal into a baseband signal so as to be processed by a corresponding communication processor of the first communication processor 212 or the second communication processor 214.

The third RFIC 226 may convert a baseband signal generated by the second communication processor 214 into an RF signal (hereinafter referred to as a "5G Above6 RF signal") in a 5G Above6 band (e.g., approximately 6 GHz to approximately 60 GHz) to be used in the second cellular network 294 (e.g., a 5G network). In the case of receiving a signal, a 5G Above6 RF signal may be obtained from the second cellular network 294 (e.g., a 5G network) through an antenna (e.g., the antenna 248) and may be pre-processed through a third RFFE 236. The third RFIC 226 may convert the preprocessed 5G Above6 RF signal to a baseband signal so as to be processed by the second communication processor 214. According to an embodiment, the third RFFE 236 may be formed as a part of the third RFIC 226.

According to an embodiment, the electronic device 101 may include the fourth RFIC 228 independently of the third RFIC 226 or as at least part of the third RFIC 226. In this case, the fourth RFIC 228 may convert a baseband signal generated by the second communication processor 214 into an RF signal (hereinafter referred to as an "IF signal") of an intermediate frequency band (e.g., approximately 9 GHz to approximately 11 GHz) and then transfer the IF signal to the third RFIC 226. The third RFIC 226 may convert the IF signal into a 5G Above6 RF signal. In the case of receiving a signal, a 5G Above6 RF signal may be received from the second cellular network 294 (e.g., a 5G network) through an antenna (e.g., the antenna 248) and may be converted into an IF signal by the third RFIC 226. The fourth RFIC 228 may convert the IF signal into a baseband signal to be processed by the second communication processor 214.

According to an embodiment, the first RFIC 222 and the second RFIC 224 may be implemented with at least part of a single chip or a single package. According to various embodiments, in case that the first RFIC 222 and the second RFIC 224 in FIG. 2A or FIG. 2B are implemented in a single chip or a single package, they may be implemented as an integrated RFIC. In this case, the integrated RFIC may be connected to the first RFFE 232 and the second RFFE 234 to convert a baseband signal into a signal in a band supported by the first RFFE 232 and/or the second RFFE 234, and to transmit the converted signal to one of the first RFFE 232 and the second RFFE 234. According to an embodiment, the first RFFE 232 and the second RFFE 234 may be implemented as at least part of a single chip or a single package. According to an embodiment, at least one antenna module of either the first antenna module 242 or the second antenna module 244 may be omitted or combined with another antenna module to process RF signals in a corresponding plurality of bands.

According to an embodiment, the third RFIC 226 and the antenna 248 may be disposed at the same substrate to form a third antenna module 246. For example, the wireless communication module 192 or the processor 120 may be disposed on a first substrate (e.g., a main PCB). In this case, the third antenna module 246 may be formed by disposing the third RFIC 226 on a partial region (e.g., on a lower surface) of a second substrate (e.g., a sub PCB) separated from the first substrate and by disposing the antenna 248 in another partial region (e.g., on an upper surface) of the second substrate. As the third RFIC 226 and the antenna 248 are disposed on the same substrate, it may be possible to decrease a length of a transmission line between the third RFIC 226 and the antenna 248. For example, the decrease in the transmission line may make it possible to prevent/reduce a signal in a high-frequency band (e.g., approximately 6 GHz to approximately 60 GHz) used for the 5G network communication from being lost (or attenuated) due to the transmission line. Accordingly, the electronic device 101 may improve the quality or speed of communication with the second cellular network 294 (e.g., 5G network).

According to an embodiment, the antenna 248 may be formed as an antenna array including a plurality of antenna elements that may be used for beamforming. In this case, the third RFIC 226 may include a plurality of phase shifters 238 corresponding to the plurality of antenna elements, for example, as part of the third RFFE 236. During transmission, the plurality of phase shifters 238 may convert the phase of a 5G Above6 RF signal to be transmitted to the outside (e.g., a base station of a 5G network) of the electronic device 101 through respective corresponding antenna elements. Upon reception, the plurality of phase converters 238 may convert the phase of a 5G Above6 RF signal received from the outside through respective corresponding antenna elements into the same or substantially the same phase. Accordingly, transmission or reception is possible through beamforming between the electronic device 101 and the outside.

The second cellular network 294 (e.g., the 5G network) may operate independently of the first cellular network 292 (e.g., the legacy network) (e.g., standalone (SA)), or may operate in conjunction therewith (e.g., non-standalone (NSA)). For example, the 5G network may have only an access network (e.g., a 5G radio access network (RAN) or next generation RAN (NG RAN)), and may not have a core network (e.g., a next generation core (NGC)). In this case, the electronic device 101 may access the access network of the 5G network and then may access an external network (e.g., the Internet) under the control of a core network (e.g., an evolved packed core (EPC)) of the legacy network. Protocol information for communication with the legacy network (e.g., LTE protocol information) or protocol information for communication with the 5G network (e.g., new radio (NR) protocol information) may be stored in the memory 130 so as to be accessed by another component (e.g., the processor 120, the first communication processor 212, or the second communication processor 214).

Figure 3:
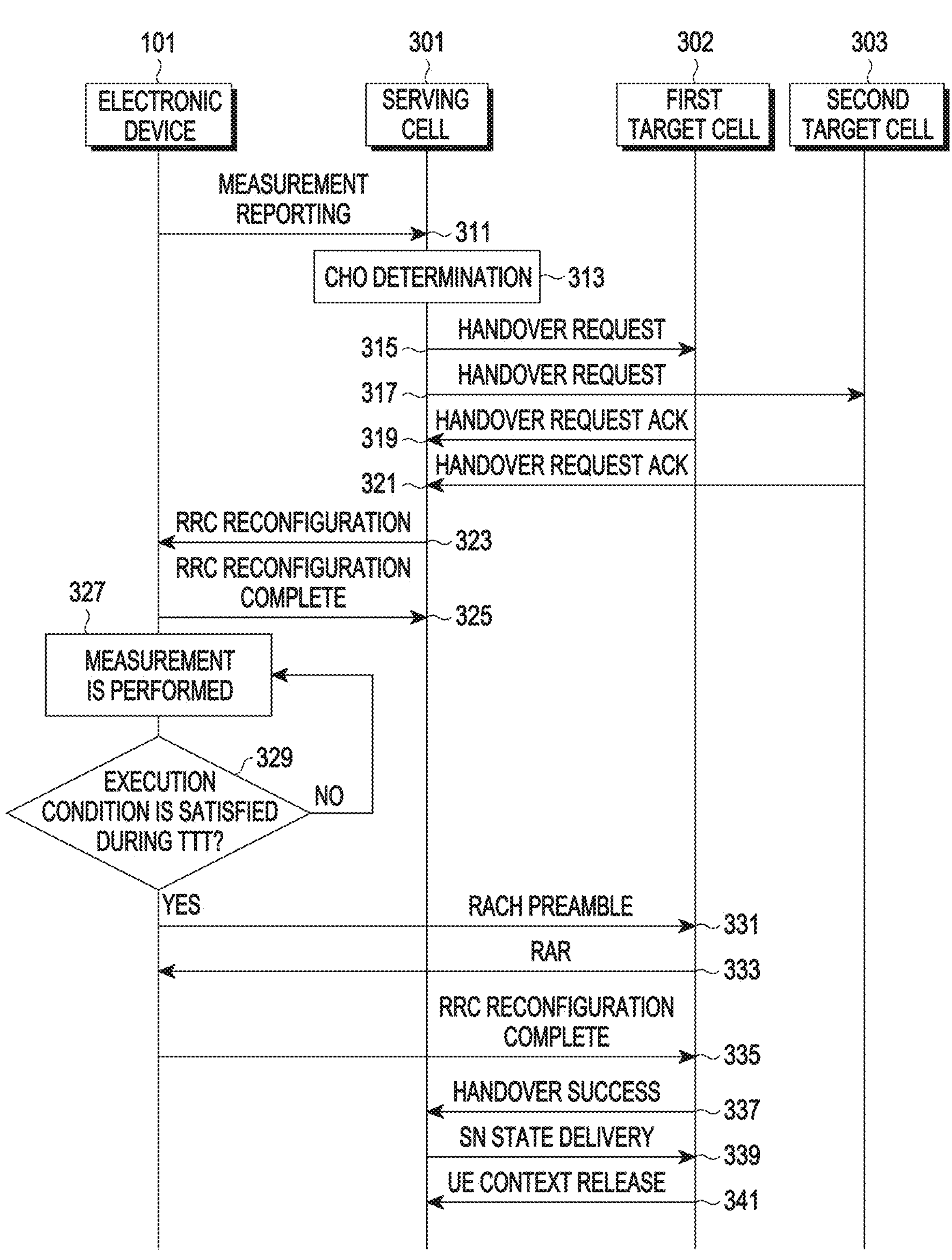
FIG. 3 is a signal flow diagram illustrating an example method of operating an electronic device and a network according to various embodiments.

FIG. 3 is a signal flow diagram illustrating an example method of operating an electronic device and a network according to various embodiments.

According to various embodiments, the electronic device 101 (e.g., at least one of the processor 120, the first communication processor 212, the second communication processor 214, or the integrated communication processor 260) may perform measurement reporting to a serving cell 301 in operation 311. Although not shown, before operation 311, the electronic device 101 may receive, from the serving cell 301, an RRC reconfiguration message (e.g., an RRC connection reconfiguration message of 3GPP technical specification (TS) 36.331 or an RRC reconfiguration message of TS 38.331). At least one of the serving cell 301, a first target cell 302, and a second target cell 303 may be a base station (e.g., at least one of eNB, gNB, ng-eNB, or en-gNB). However, in case that some of the functions of the base station are virtualized, they may be implemented as at least part of hardware for radio control and a server for performing the virtualized functions. The serving cell 301 may be referred to as a source base station, and the target cell may be referred to as a target base station. The target cells 302 and 303 may be represented as candidate cells before being selected by the electronic device 101 as a handover target. The serving cell 301 may perform an RRC connection reconfiguration procedure in case that the electronic device 101 is in an RRC connected state (RRC_CONNECTED state), for example. For example, in case that measurement configuration (e.g., measConfig of 3GPP TS 38.331 or 36.331) is included in the RRC connection reconfiguration message, the electronic device 101 may perform a measurement configuration procedure (e.g., a measurement configuration procedure configured in in 3GPP TS 38.331 or 36.331). For example, the electronic device 101 may be requested to perform the following types of measurements.

- Intra-frequency measurements: measurements in the down-link carrier frequency(ies) of the serving cell(s)
- Inter-frequency measurements: measurements at frequencies different from any frequency of the down-link carrier frequency(ies) of the serving cell(s)
- Measurements at frequencies of inter-RAT (e.g., NR, UTRA, GERAN, CDMA 2000 HRPD, or CDMA 2000 1×RTT)

Measurement configurations may include information on a measurement object. A measurement object may include, for example, a subcarrier spacing of a reference signal to be measured and a frequency/time location. The electronic device 101 may identify a frequency for measurement based on a measurement object in a measurement configuration. The measurement object may also include information indicating a frequency to be measured (e.g., ARFCN-ValueEUTRA and/or ARFCN-ValueNR), a measurement object identity, or a cell blacklist and/or cell whitelist.

According to various embodiments, the measurement configuration of the RRC reconfiguration message may include reporting configuration. For example, the reporting configuration may include at least one of a reporting criterion, a reporting format, or an RS type, but is not limited thereto. The reporting criterion is a condition that triggers the user equipment to transmit a measurement report, and may be a periodic or single event descriptor. The reporting format may be, for example, in the case of LTE communication, information about quantity and related information (e.g., the number of cells to be reported) included in the measurement report by the user equipment. The reporting format may be, for example, in the case of 5G communication, quantity per cell and per beam to be included in the measurement report and other related information (e.g., the maximum number of cells and the maximum number of beams per cell to be reported). The RS type may indicate, for example, the RS of the measurement result and the beam to be used by the user equipment. Meanwhile, in the case of performing MR, events may be expressed as reporting criteria, and in the case of performing an operation for conditional reconfiguration (for example, handover), events may be expressed as execution conditions.

According to various embodiments, the measurement configuration of the RRC connection reconfiguration message may include at least one of measurement identification information (measurement identity), quantity configuration, or measurement gap. The measurement identification information may be a list of measurement identification information associated with a measurement object. Quantitative configuration may define periodic reporting of measurements and measurement filtering configurations that are used in all event evaluation and related reporting. The measurement gap is a period in which the UE performs measurement, and may be, for example, a duration in which uplink or downlink transmission is not scheduled.

The electronic device 101 may, depending on measurement configurations, perform a measurement of at least one of a reference signal received power (RSRP), a reference signal received quality (RSRQ), a reference signal strength indicator (RSSI), or a signal to interference-plus-noise ratio (SINR) corresponding to at least one of inter-frequency, intra-frequency, or inter-RAT. Performing the RSRP measurement of the electronic device 101 may refer, for example, to at least one of the processor 120, the first communication processor 212, the second communication processor 214, or the unified communication processor 260 identifying the RSRP measurement value, but is not limited thereto. For example, the electronic device 101 may identify, as the RSRP measurement value, the linear average of the power distribution (wattage [W] units) of a resource element that carries at least one of a reference signal or a synchronization signal within a frequency bandwidth to be measured. Meanwhile, the reference signal and the synchronization signal are not limited as long as they are signals defined in 3GPP. For example, the electronic device 101 may identify the RSRP measurement value based on the linear average of the power distribution at the reference point. For example, in the case of LTE communication, the electronic device 101 may identify the RSRP measurement value based on a linear average of power distribution at an antenna connector of an antenna (e.g., the first antenna module 242) through which a corresponding communication signal is received. For example, in the case of FR1 of NR, the electronic device 101 may identify the RSRP measurement value based on the linear average of the power distribution at the antenna connector of the antenna (e.g., the first antenna module 244) through which the corresponding communication signal is received. For example, in the case of FR2 of NR, the electronic device 101 may identify a measurement value (e.g., synchronization signal-reference signal received power (SS-RSRP)) based on a combined signal from an antenna element (e.g., at least one antenna element of the antenna 248) corresponding to a given receiver branch. Although not shown, the electronic device 101 may include at least one sensor (e.g., at least one of a voltage sensor, a current sensor, or a power sensor) capable of measuring power at a reference point (e.g., an antenna connector), and may measure power at a reference point based on sensing data from at least one sensor. As described above, since there is no limitation on the reference point, there is no limit on the location where at least one sensor is connected. In various embodiments of the disclosure, the performing of the RSRQ measurement by the electronic device 101 may refer to identifying the RSRQ measurement value by at least one of the processor 120, the first communication processor 212, the second communication processor 214, or the unified communication processor 260, but is not limited thereto.

The electronic device 101 may identify that a measurement result satisfies the reporting criterion. For example, the electronic device 101 may identify a measurement result from a physical layer, and the electronic device 101 may determine whether a reporting criterion is satisfied based on the measurement result. The electronic device 101 may perform filtering (e.g., layer 3 filtering) on the performance result, and may determine whether the reporting criterion is satisfied based on a result of the filtering. In various embodiments of the disclosure, a "measurement result" may refer to, for example, at least one of a value obtained from a physical layer or a value obtained by filtering a value obtained from the physical layer. Reporting criteria (or execution conditions to be described below) may include, for example, as follows, but are not limited thereto.

Event A1: Serving becomes better than threshold;

Event A2: Serving becomes worse than threshold;

Event A3: Neighbor becomes offset better than PCell/PSCell (or SpCell in NR);

Event A4: Neighbor becomes worse than threshold;

Event A5: PCell/PSCell (or SpCell in NR) becomes worse than threshold1 and neighbor becomes better than threshold2;

Event A6: Neighbor becomes offset better than SCell (or SCell of NR);

Event B1: Inter RAT neighbor becomes better than threshold; and/or

Event B2: PCell becomes worse than threshold1 and inter RAT neighbor becomes better than threshold2.

The above-described reporting criteria may follow, for example, 3GPP TS 36.331 or 3GPP TS 38.331, but there is no limitation to the type. Based on the satisfaction of the reporting criterion, the electronic device 101 may perform measurement reporting in operation 311. For example, the electronic device 101 may transmit a measurement report message to the serving cell 301 when a satisfied reporting criterion among the above-described reporting criteria is maintained during a time to trigger. The electronic device 101 may configure a measurement result (e.g., measResults of 3GPP TS 38.331 or 3GPP TS 36.331) in the measurement report message with respect to measurement identification information through which a measurement report procedure is triggered. An information element (IE) of the measurement result may include a measured result (e.g., at least one of RSRP, RSRQ, or SINR) for intra-frequency, inter-frequency, and inter-RAT mobility. For example, the measurement report message may include measurement identification information and measurement results.

According to various embodiments, the serving cell 301 may, in operation 313, determine to cause the electronic device 101 to configure a conditional handover (CHO) based on information included in the measurement reporting message. For example, it is assumed that the serving cell 301 has determined the first target cell 302 and the second target cell 303 as candidate target cells based on at least one received measurement report message. In operation 315, the electronic device 101 may request handover to the first target cell 302. In operation 317, the electronic device 101 may request handover to the second target cell 303. In operation 317, the first target cell 302 may transmit a handover request Ack to the serving cell 301 in response to the handover request. In operation 319, the first target cell 302 may transmit the handover request Ack to the serving cell 301 in response to the handover request. In operation 321, the second target cell 303 may transmit the handover request Ack to the servicing cell 301 in response to the handover request.

According to various embodiments, the serving cell 301 may transmit an RRC reconfiguration message to the electronic device 101 in operation 323. The electronic device 101 may transmit an RRC reconfiguration complete message corresponding to the RRC reconfiguration message to the serving cell 301 in operation 325. For example, in FIG. 3, the electronic device 101 is shown as receiving one RRC reconfiguration message from the serving cell 301 in operation 323, but this is an example, and the electronic device 101 may receive one RRC reconfiguration message, or may receive a plurality of RRC reconfiguration messages. In case that the at least one RRC reconfiguration message includes conditional reconfiguration addition and/or modification information (e.g., condReconfigAddModList), the electronic device 101 may add and/or modify conditional reconfiguration. Table 1 is an example of additional information of conditional reconfiguration.

TABLE 1

```
CondReconfigToAddModList-r16 ::= SEQUENCE (SIZE (1.. maxNrofCondCells-r16)) OF
CondReconfigToAddMod-r16
CondReconfigToAddMod-r16 ::=    SEQUENCE {
  condReconfigId-r16                CondReconfigId-r16,
  condExecutionCond-r16             SEQUENCE (SIZE (1..2)) OF MeasId
OPTIONAL,     -- Cond condReconfigAdd
  condRRCReconfig-r16               OCTET STRING (CONTAINING RRCReconfiguration)
OPTIONAL,     -- Cond condReconfigAdd
  ...
```

The additional information of the conditional reconfiguration may include conditional reconfiguration identification information (condReconfigId), conditional execution condition (condExecutionCond), and/or conditional RRC reconfiguration information (condRRCReconfig), but is not limited thereto. The conditional execution condition (condExecutionCond) may include measurement identification information (MeasID), and the measurement object (measObject) and report configuration (reportConfig) may be linked by the measurement identification information (MeasID). The electronic device 101 may link a measurement object (measObject) and a report configuration (reportConfig) by the measurement identification information (MeasID) based on information included in at least one RRC reconfiguration message received before and/or after performing MR. Accordingly, the execution condition (e.g., A3 event and/or A5 event) may be identified by the measurement identification information (MeasID) included in the conditional execution condition (condExecutionCond). For example, a measurement object (measObject) may include information related to the frequency of a measurement object, and the report configuration (reportConfig) may include information for configuring an event (e.g., A3 event and/or A5 event). The report configuration (reportConfig) may be, for example, condTriggerConfig-r16. Meanwhile, the electronic device 101 may identify the measurement object (measObject) and/or report configuration (reportConfig), which are linked by the measurement identification information (MeasID), through one or a plurality of RRC reconfiguration messages. In an example, the electronic device 101 may receive one RRC reconfiguration message including first identification information of a measurement object (measObject), second identification information of a report configuration (reportConfig), and measurement identification information (MeasID) for linking the first identification information and the second identification information. In another example, the electronic device 101 may receive an RRC reconfiguration message including first identification information of a measurement object (measObject), may receive an RRC reconfiguration message including second identification information of a report configuration (reportConfig), and may receive a plurality of RRC reconfiguration messages including measurement identification information (MeasID) for linking the first identification information and the second identification information. There is no limitation on the order in which RRC reconfiguration messages are received. As described above, there is no limitation on reception of information for configuring conditional execution conditions. The conditional RRC reconfiguration information (condRRCReconfig) may include information (e.g., PCI) for identifying the target cells 302 and 303 and/or information associated with resources allocated to the target cells 302 and 303. In an example, a report configuration (reportConfig) (e.g., CondTriggerConfig-r16) may include an A3 event and/or an A5 event, and this may be shown in Table 2.

TABLE 2

```
CondTriggerConfig-r16 ::=     SEQUENCE {
  condEventId                   CHOICE {
    condEventA3                   SEQUENCE {
      a3-Offset                     MeasTriggerQuantityOffset,
      hysteresis                    Hysteresis,
      timeToTrigger                 TimeToTrigger
    },
    condEventA5                   SEQUENCE {
      a5-Threshold1                 MeasTriggerQuantity,
      a5-Threshold2                 MeasTriggerQuantity,
      hysteresis                    Hysteresis,
      timeToTrigger                 TimeToTrigger
    },
    ...
  },
  rsType-r16                    NR-RS-Type,
  ...
}
```

As described above, the A3 event may refer, for example, to the neighbor cell becoming better than the PCell/PSCell (or SpCell of NR) by an offset, and Equation 1 may be an entering execution condition of the A3 event.

$$Mn+Ofn+Ocn-Hys>Mp+Ofp+Ocp+Off \quad \text{[Equation 1]}$$

In Equation 1, Mn may be a measurement result of a neighbor cell. Ofn may be a measurement object specific offset of a reference signal of a neighbor cell. Ocn may be a cell specific offset of a neighbor cell. Mp may be a measurement result of PCell, PSCell (or serving cell), or SpCell of NR. Ofp may be a measurement object specific offset of Spcell. Ocp may be a cell specific offset of Spells. Hys may be a hysteresis parameter of the A3 event (e.g., hysteresis in condEventA3 of Table 2). Off may be an offset parameter of the A3 event (e.g., a3-Offset in Table 2). Mn and Mp may be expressed in dBm in case of RSRP or in dB in case of RSRQ and RS-SINR. Ofn, Ocn, Ofp, Ocp, Hys, and Off may be expressed in dB. When the entering execution condition such as Equation 1 is satisfied, the electronic device 101 may determine whether or not the execution condition remains satisfied during the TTT, for example, whether a leaving execution condition is not satisfied. Equation 2 may be a leaving execution condition of the A3 event.

$$Mn+Ofn+Qcn+Hys<Mp+Ofp+Ocp+Off \quad \text{[Equation 2]}$$

Parameters in Equation 2 may be the same as those described in Equation 1. If, before the TTT, the leaving execution condition such as Equation 2 is satisfied, the electronic device 101 may not perform handover according to the conditional reconfiguration. If, before the TTT, the leaving execution condition as shown in Equation 2 is not satisfied, the electronic device 101 may perform a handover corresponding to the event A3.

As described above, the A5 event may refer, for example, to the PCell/PSCell (or SpCell of NR) becoming worse than the first threshold, and the neighbor cell (or neighbor/SCell of NR) becoming better than the second threshold, Equations 3 and 4 may be the first entering condition and the second entering condition of the A5 event, respectively.

$$Mp+Hys<Thresh1 \quad \text{[Equation 3]}$$

$$Mn \pm Ofn+Ocn-Hys>Thresh2 \quad \text{[Equation 4]}$$

In Equation 3, Mp may be a measurement result of PCell, PSCell (or serving cell), or SpCell of NR. Thresh1 may be a first threshold for the A5 event (e.g., a5-Threshold1 in Table 2). In Equation 4, Mn may be a measurement result of a neighbor cell. Ofn may be a measurement object specific offset of a neighbor cell. Ocn may be a cell specific offset of a neighbor cell. Thresh2 may be a second threshold for the A5 event (e.g., a5-Threshold2 in Table 2). Hys in Equations 3 and 4 may be a hysteresis parameter of the A5 event (e.g., hysteresis in condEventA5 of Table 2). Mn and Mp may be expressed in dBm in case of RSRP or in dB in case of RSRQ and RS-SINR. Ofn, Ocn, Hys may be expressed in dB. When two entering execution conditions such as Equation 3 and Equation 4 are satisfied, the electronic device 101 may determine whether the execution condition remains satisfied during the TTT, for example, whether the leaving execution condition is not satisfied. Equations 5 and 6 may be leaving execution conditions of the A5 event.

$$Mp-Hys>Thresh1 \quad \text{[Equation 5]}$$

$$Mn+Ofn+Ocn+Hys<Thresh2 \quad \text{[Equation 6]}$$

Parameters in Equations 5 and 6 may be the same as those described in Equations 3 and 4. If the plurality of leaving execution conditions of Equations 5 and 6 are satisfied before the TTT, the electronic device 101 may not perform handover according to the conditional reconfiguration. If the plurality of leaving execution conditions of Equations 5 and 6 are not satisfied before the TTT, the electronic device 101 may perform a handover corresponding to the A5 event.

According to various embodiments, the electronic device 101 may perform measurements on neighboring target cells 302 and 303 in operation 327. The electronic device 101 may determine whether the execution condition is satisfied during the TTT, based on the measurement result, in operation 329. Satisfaction of the execution condition during the TTT may be determined as failing to satisfy the leaving execution condition during the TTT after the satisfaction of the entering execution condition, as described above. For example, the electronic device 101 may identify (or consider) a cell having a physical cell identity (PCI) that matches a value designated by the conditional RRC reconfiguration (condRRCReconfig) for each conditional reconfiguration identifier (condReconfigId) in VarConditionReconfig. For the measurement ID (measId) in the measurement ID list (measIdList) in VarMeasConfig designated in the conditional execution condition (condExecutionCond) associated with the conditional reconfiguration identifier (condReconfigId), the electronic device 101 may, in case that applicable conditions are satisfied for a cell to which the measurement result is applicable, identify that an event associated with the measure ID (measId) is fulfilled. In case that the event (s) associated with the measurement ID (measID) (s) in the conditional trigger configuration (condTriggerConfig) for the stored candidate cell in the condition RRC reconfiguration (condRRCReconfig) is fulfilled, the electronic device 101 may identify, as a triggered cell, a candidate cell in the conditional RRC reconfiguration (condRRCReconfig) associated with the corresponding conditional reconfiguration ID (condReconfigId). In case that one or more triggered cells exist, the electronic device 101 may select one of the triggered cells as a selected cell for conditional reconfiguration execution, and this will be described in greater detail below. The electronic device 101 may apply conditional RRC reconfiguration (condRRCReconfig) of the selected cell and perform an operation corresponding thereto. For example, the electronic device 101 may perform conditional handover. In case that the execution condition is not satisfied during the TTT ("No" in operation 329), the electronic device 101 may continue performing the measurement. In the embodiment of FIG. 3, it is assumed that the first target cell 302 is identified as a triggered cell.

According to various embodiments, when the execution condition during the TTT is satisfied ("Yes" in operation 329), the electronic device 101 may transmit a RACH preamble message to the first target cell 302 corresponding to the satisfied execution condition in operation 331. The first target cell 302 may transmit a random access response (RAR) message corresponding to the RACH preamble message to the electronic device 101 in operation 333. In operation 335, the electronic device 101 may transmit an RRC reconfiguration complete message (e.g., an RRC connection reconfiguration complete message of TS 36.331 or an RRC reconfiguration complete message of TS 38.331) corresponding to the RAR message. On the other hand, it will be understood by those skilled in the art that performing at least some of transmission and reception of a RACH preamble message, transmission and reception of a RAR message, or transmission and reception of an RRC reconfiguration complete message may be referred to as performing at least one procedure for RACH, and may be replaced with various RACH procedures. The first target cell 302 may notify the serving cell 301 of successful handover in operation 337. In operation 339, the serving cell 301 may transfer an SN state to the first target cell 302. In operation 341, the first target cell 302 may request the serving cell 301 to release the UE context for the electronic device 101. As described above, the electronic device 101 may conditionally perform handover when the execution condition is satisfied during the TTT, not immediately after performing the MR in operation 311.

Figure 4:
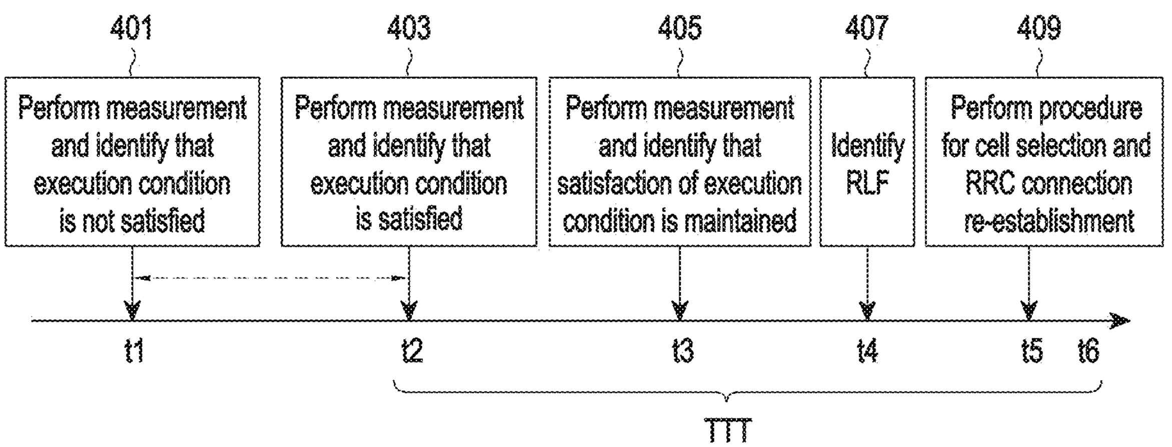
FIG. 4 is a diagram illustrating timing according to a comparative example for comparison with various embodiments.

FIG. 4 is a diagram illustrating timing according to a comparative example for comparison with various embodiments. At least some of the operations of the electronic device 101 according to the comparative example of FIG. 4 may be performed by the electronic device 101 according to various embodiments.

For example, in operation 401, the electronic device 101 may perform measurement at time point t1, and identify that a result of the measurement fails to satisfy an execution condition. For example, as in operation 323 of FIG. 3, the electronic device 101 may receive an RRC reconfiguration message including conditional reconfiguration information. The electronic device 101 may perform measurement on a measurement object that is identified at least based on the RRC reconfiguration message. The electronic device 101 may identify that the measurement result fails to satisfy the execution condition identified at least based on the RRC reconfiguration message. For example, the electronic device 101 may identify that the measurement result fails to satisfy the entering execution condition, and accordingly, the computation of the TTT may not be started. In operation 403, the electronic device 101 may perform measurement at time point t2 and identify that the execution condition is satisfied. The interval between time points t1 and t2 may be, for example, a measurement gap configured by a network, but is not limited thereto. For example, the electronic device 101 may identify that the measurement result at t2 satisfies the entering execution condition. The electronic device 101 may be configured to perform an operation according to a conditional configuration when it is identified that the plurality of measurement results fail to satisfy the leaving execution condition during the TTT. For example, it is assumed that the time point obtained by adding the TTT period to the time point t2 corresponds to time point t6.

In operation 405, the electronic device 101 may perform measurement at time point t3 and identify that the execution condition remains satisfied. For example, the electronic device 101 may identify that a measurement result at the time point t3 fails to satisfy the leaving execution condition. In operation 407, the electronic device 101 may identify an RLF at time point t4. As the execution condition does not remain satisfied during the TTT, the conditional reconfiguration operation may not be performed. The electronic device 101 may be configured to perform at least one procedure for RRC re-establishment in response to the RLF. In operation 409, at time point t5, the electronic device 101 may perform a procedure for cell selection and RRC connection re-establishment. The electronic device 101 may perform cell search, and may perform cell selection based on the search result, and/or camping on the selected cell. The electronic device 101 may transmit an RRC re-establishment request message (e.g., an RRCConnectionReestablishmentRequest message in 3GPP TS 36.331 or an RRCReestablishmentRequest message in 3GPP TS 38.331) to the selected (or camp-on) cell. The cell having received the RRC re-establishment request message may transmit a re-establishment complete message (e.g., RRCConnection-Reestablishment message of 3GPP TS 36.331 or RRCReestablishment message of 3GPP TS 38.331) to the electronic device 101. Based on the reception of the re-establishment complete message, the electronic device 101 may transmit an RRC re-establishment identification message (e.g., an RRCConnectionReestablishmentComplete message in 3GPP TS 36.331 or an RRCReestablishmentComplete message in 3GPP TS 38.331) to the cell. However according to the comparative example, despite a case in which the handover success probability is relatively high as the entering execution condition is satisfied, the electronic device 101 should perform the cell selection and RRC re-establishment procedure according to the identification of the RLF occurrence, the time to reconnect to the network may be delayed. The electronic device 101 according to various embodiments may perform a procedure for handover to a specific cell if a measurement result of a specific cell satisfies a predetermined condition even when the RLF has occurred. In an example, in case that the measurement result of a specific cell is shorter than the TTT configured by the network, but maintained longer than a sufficient period (e.g., half of the TTT configured by the network), the electronic device 101 may perform a procedure for handover to the specific cell. In this case, the probability of a handover for a particular cell may be relatively high, and thus the time to access the network may be likely to be reduced compared to the comparative example. Meanwhile, various examples of the above-described conditions will be described below. Meanwhile, although not shown, the electronic device 101 may transmit MCG failure information according to the RLF identification. Alternatively, the electronic device 101 may transmit, for example, SCG failure information according to identification of the RLF for the cell of the SCG. Even in these cases, the electronic device 101 may perform a procedure for handover to a specific cell if a measurement result of a specific cell satisfies a predetermined condition even when RLF occurs.

Figure 5A:
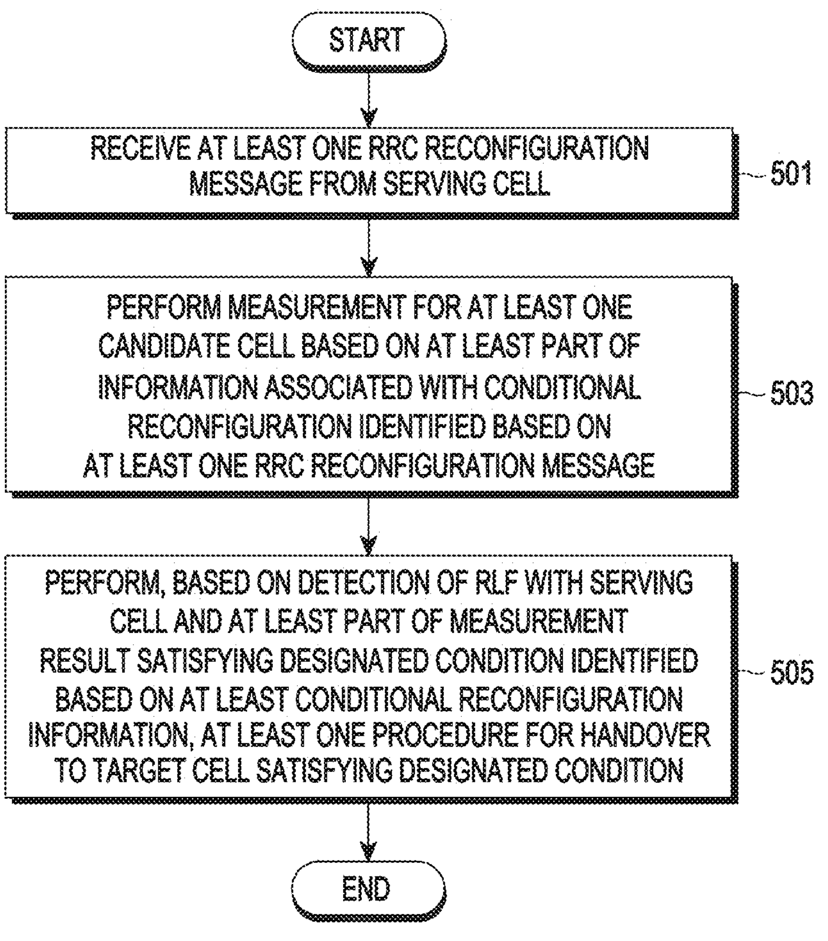
FIG. 5A is a flowchart illustrating an example method of operating an electronic device according to various embodiments.

FIG. 5A is a flowchart illustrating an example method of operating an electronic device according to various embodiments.

According to various embodiments, the electronic device 101 (e.g., at least one of the processor 120, the first communication processor 212, the second communication processor 214, or the integrated communication processor 260) may receive at least one RRC reconfiguration message from the serving cell in operation 501. In operation 503, the electronic device 101 may measure at least one candidate cell based on at least a part of information associated with conditional reconfiguration identified based on at least one RRC reconfiguration message. For example, the electronic device 101 may receive at least one RRC reconfiguration message, and based on the at least one RRC reconfiguration message, and may identify, as information associated with conditional reconfiguration, at least one of measurement identification information, measurement object information (e.g., frequency) corresponding to the measurement identification information, reporting configuration information corresponding to measurement identification information (e.g., information including the A3 event and/or A5 event), or cell identification information (e.g., information for PCI and/or RACH). Since this has been described with reference to FIG. 3, a detailed description thereof may not be repeated here. Meanwhile, information associated with conditional reconfiguration is not limited. As described above, the electronic device 101 may identify information associated with conditional reconfiguration based on at least one RRC reconfiguration message received before and/or after performing the MR.

According to various embodiments, in operation 505 the electronic device 101 may perform, based on that an RLF with a serving cell is detected and at least a part of the measurement result satisfies a designated condition identified based on information associated with the conditional reconfiguration, at least one procedure for handover to a target cell that satisfies the designated condition. The RLF may be identified according to at least one of, for example, the expiration of a T310 timer, the expiration of a T312 timer, or the RLC maximum number of transmissions, but there is no limitation to the conditions that cause the RLF. In an example, the electronic device 101 may identify that a designated condition is satisfied when an entering execution condition among execution conditions identified based on information associated with conditional reconfiguration is satisfied. For example, the electronic device 101 may identify that the designated condition is satisfied based on that an entering execution condition is satisfied and a leaving execution condition is not satisfied at the time point of identifying the RLF occurrence. In an example, the electronic device 101 may identify that a designated condition is satisfied when an execution condition identified based on information associated with conditional reconfiguration is satisfied during the adjusted TTT. The adjusted TTT is not limited as long as it is shorter than the TTT configured by the network, for example, which will be described in greater detail below. In an example, the electronic device 101 may identify that a designated condition is satisfied when an execution condition more relaxed than an execution condition identified based on information associated with conditional reconfiguration is satisfied during the TTT (or more). The relaxed execution condition may be, for example, an execution condition in which at least one of the offset of A3 event or at least one threshold value (e.g., Threshold 1 and/or Threshold 2) of event A5 is adjusted, and this will be described in greater detail below. In an example, the electronic device 101 may identify that a designated condition is satisfied when an execution condition that is more relaxed than the execution condition identified based on the information associated with the conditional reconfiguration is satisfied during the adjusted TTT (or more). In an example, the electronic device 101 may identify that a designated condition is satisfied when an execution condition stricter than an execution condition identified based on the information associated with conditional reconfiguration is satisfied. The strict execution condition may be, for example, an execution condition in which at least one of the offset of A3 event or at least one threshold value (e.g., Threshold 1 and/or Threshold 2) of event A5 is adjusted, and this will be described in greater detail below.

As described above, even in case that the execution condition for conditional handover is not maintained during the TTT, the electronic device 101 may perform a procedure for handover to a target cell that satisfies a designated condition based on the occurrence of RLF. Accordingly, in the case of RLF occurrence, a handover to a target cell with a relatively high probability of successful handover can be performed, and thus the possibility of shortening the time required for access to the network than that of the existing RRC connection re-establishment procedure may increase.

Figure 5B:
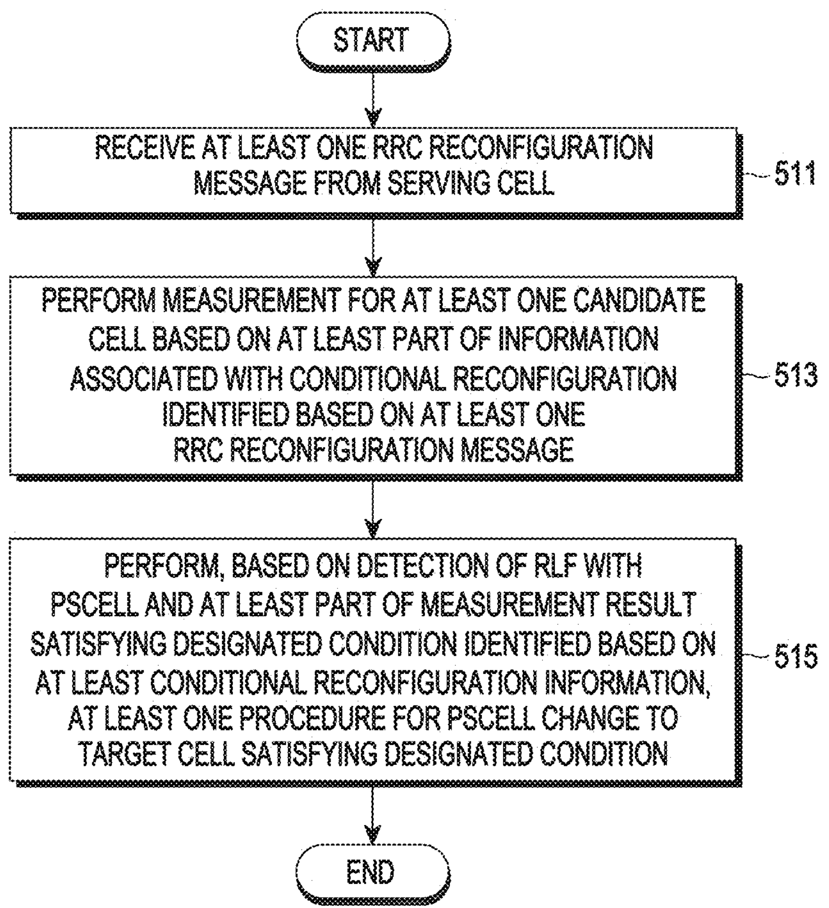
FIG. 5B is a flowchart illustrating an example method of operating an electronic device according to various embodiments.

FIG. 5B is a flowchart illustrating an example method of operating an electronic device according to various embodiments.

According to various embodiments, the electronic device 101 (e.g., at least one of the processor 120, the first communication processor 212, the second communication processor 214, or the integrated communication processor 260) may receive at least one RRC reconfiguration message from a serving cell in operation 511. The electronic device 101 may receive an RRC reconfiguration message for conditional PSCell change while being connected to a serving cell of a first RAT and a PSCell of a second RAT according to dual connectivity. The RRC reconfiguration message may include reconfiguration information related to PSCell change. The electronic device 101 may receive reconfiguration information for the SCG from the serving cell 301. In operation 513, the electronic device 101 may measure at least one candidate cell based on at least a part of information associated with conditional reconfiguration identified based on at least one RRC reconfiguration message.

According to various embodiments, in operation 515, the electronic device 101 may perform, based on that an RLF with a PSCell is detected and at least a part of the measurement result satisfies a designated condition identified based on information associated with the conditional reconfiguration, at least one procedure for changing the PScell to a target cell that satisfies the designated condition. The designated condition here may be the same as at least one of the designated conditions described with reference to FIG. 5A. As described above, the electronic device 101 may perform a handover procedure to a target cell that satisfies a designated condition instead of transmitting an SCG failure message upon detection of an RLF with the PSCell. Accordingly, when an RLF with an existing PSCell occurs, the possibility of shortening the time required for access to the PSCell may increase.

As described above, even when the execution condition for conditional handover is not maintained during the TTT, the electronic device 101 may perform a procedure for a PSCell change to a target cell satisfying a designated condition (e.g., a procedure for handover to a target cell to which a PSCell change is to be performed) based on the occurrence of the RLF. Accordingly, when an RLF occurs, a PSCell change (e.g., handover) to a target cell with a relatively high probability of a successful PSCell change (e.g., handover) may be performed, thereby increasing the probability of access to the network in a shorter time compared to a procedure based on the existing SCG failure message transmission.

Figure 6A:
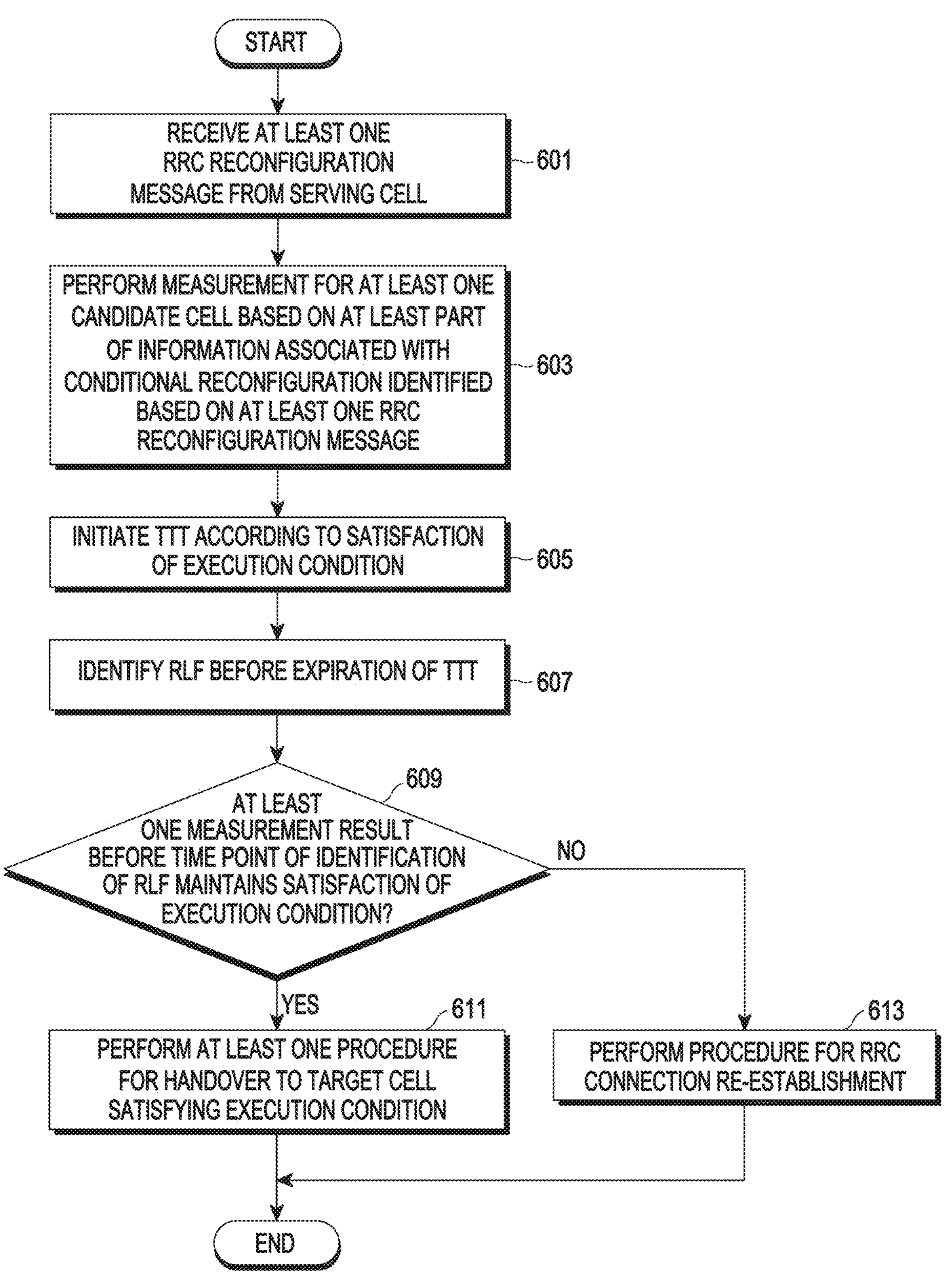
FIG. 6A is a flowchart illustrating an example method of operating an electronic device according to various embodiments.

FIG. 6A is a flowchart illustrating an example method of operating an electronic device according to various embodiments.

According to various embodiments, the electronic device 101 (e.g., at least one of the processor 120, the first communication processor 212, the second communication processor 214, or the integrated communication processor 260) may receive at least one RRC reconfiguration message from the serving cell 301 in operation 601. The electronic device 101 may measure at least one candidate cell based on at least a part of information associated with conditional reconfiguration identified based on at least one RRC reconfiguration message, in operation 603. As described above, after performing MR, the electronic device 101 may receive at least one RRC reconfiguration message for conditional reconfiguration from the serving cell 301. The electronic device 101 may identify information associated with conditional reconfiguration based on at least one RRC reconfiguration message received before and/or after performing MR.

According to various embodiments, in operation 605, the electronic device 101 may initiate a TTT according to satisfaction of an execution condition. Here, initiating the TTT may refer, for example, to the electronic device 101 initiating monitoring whether a leaving execution condition is not satisfied during the TTT configured by a network upon identification of satisfaction of an entering execution condition. In operation 607, the electronic device 101 may identify the RLF before the TTT expires, for example, before the TTT elapses from the time point at which the satisfaction of the entering execution condition is identified. In the case according to the comparative example, the electronic device 101 may not perform a handover procedure because the maintenance of the satisfaction of the execution condition during the TTT has not been identified.

According to various embodiments, the electronic device 101 may determine whether at least one measurement result before the time point of identification of the RLF maintains the satisfaction of the execution condition in operation 609. For example, the electronic device 101 may store at least one measurement result, having been measured from just after the time point of initiation of the TTT in operation 605 to the time point of identification of the RLF in operation 607, and may determine whether the stored at least one measurement result maintains the satisfaction of the execution condition. For example, the electronic device 101 may determine whether at least one measurement result of a measurement object that satisfies the entering execution condition fails to satisfy the leaving execution condition. Failing to satisfy the leaving execution condition may be determined as maintaining satisfaction of the execution condition. When it is determined that at least a part of the at least one measurement result satisfies the leaving execution condition, the electronic device 101 may determine that the execution condition is not maintained. In case that the satisfaction of the execution condition is maintained until the time point at which the RLF is identified to have occurred ("Yes" in operation 609), that is, at least one measurement result, having been measured from just after the time point of initiation of the TTT in operation 605 to the time point of identification of the RLF in operation 607, maintains the satisfaction of the execution condition, the electronic device 101 may perform at least one procedure for handover to a target cell that satisfies the execution condition in operation 611. At least one procedure for handover in various embodiments may include either handover of a serving cell or handover of a PSCell change. For example, the electronic device 101 may transmit a RACH preamble message, receive a RAR message, and/or transmit a RRC connection re-establishment complete message to a target cell corresponding to a measurement object that has maintained satisfaction of the execution condition until the time point of identification of the RLF. In case that satisfaction of the execution condition is not maintained by the time point of identification of the RLF ("No" in operation 609), the electronic device 101 may perform a procedure for re-establishing the RRC connection in operation 613. For example, the electronic device 101 may perform cell search and/or cell selection and perform a procedure for re-establishing the RRC connection. Alternatively, the electronic device 101 may transmit an MCG failure message or an SCG failure message.

Figure 6B:
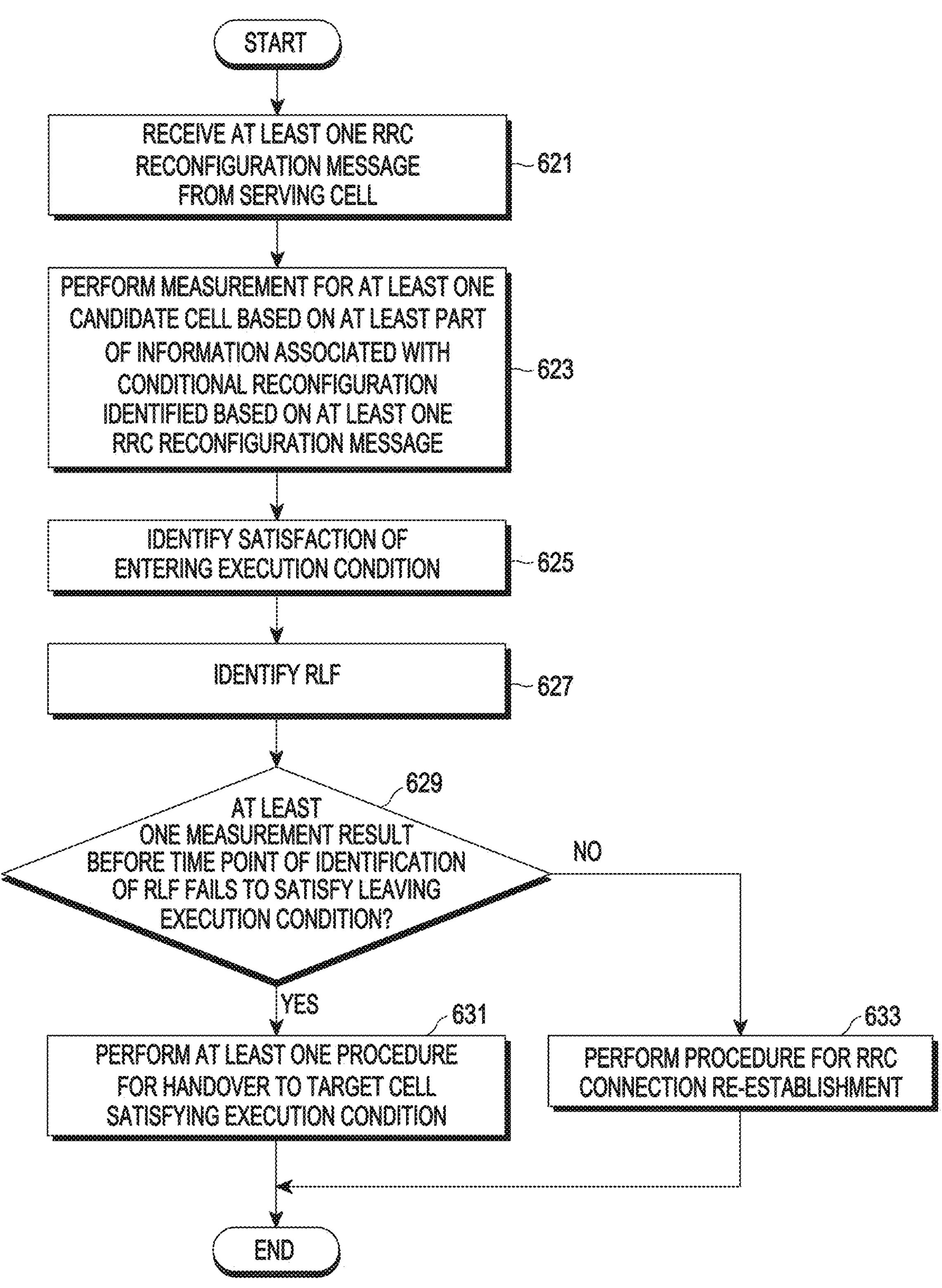
FIG. 6B is a flowchart illustrating an example method of operating an electronic device according to various embodiments.

FIG. 6B is a flowchart illustrating an example method of operating an electronic device according to various embodiments.

According to various embodiments, the electronic device 101 (e.g., at least one of the processor 120, the first communication processor 212, the second communication processor 214, or the integrated communication processor 260) may receive at least one RRC reconfiguration message from the serving cell 301 in operation 621. The electronic device 101 may measure at least one candidate cell based on at least a part of information associated with conditional reconfiguration identified based on at least one RRC reconfiguration message, in operation 623.

According to various embodiments, in operation 625, the electronic device 101 may identify whether an entering execution condition corresponding to at least one measurement object is satisfied. After identifying that the entering execution condition is satisfied, the electronic device 101 may identify the RLF in operation 627. In operation 629, the electronic device 101 may determine whether at least one measurement result before the time point of identification of the RLF fails to satisfy the entering execution condition, for example, whether the at least one measurement result maintains the execution condition. For example, the electronic device 101 may store at least one measurement result, having been measured from just after the time point of identification of satisfaction of the entering execution condition in operation 625 to the time point of identification of the RLF in operation 627, and may determine whether the stored at least one measurement result fails to satisfy the leaving execution condition. In an embodiment, the electronic device 101 may determine whether the measurement results during a period from the time point before the TTT to the time point of identification of the RLF maintain the execution condition. However, the TTT period is merely illustrative and various examples will be described in greater detail below. In case that the at least one measurement result before the time point of identification of the RLF fails to satisfy the entering execution condition ("Yes" in operation 629), that is, in case that the at least one measurement result measured from just after the time point of identification of satisfaction of the entering execution condition in operation 625 to the time point of identification of the RLF in operation 627 fails to satisfy the entering execution condition, the electronic device 101 may perform at least one procedure for handover to a target cell that satisfies the execution condition in operation 631. For example, the electronic device 101 may transmit a RACH preamble message, receive a RAR message, and/or transmit a RRC connection re-establishment complete message to a target cell corresponding to a measurement object that has maintained satisfaction of the execution condition until the time point of identification of the RLF. In case that at least one measurement result before the time point of identification of the RLF satisfies the leaving execution condition ("No" in operation 629), the electronic device 101 may perform a procedure for re-establishing the RRC connection in operation 633. For example, the electronic device 101 may perform cell search and/or cell selection and perform a procedure for re-establishing the RRC connection. Alternatively, the electronic device 101 may transmit an MCG failure message or an SCG failure message.

In another example, the electronic device 101 may be implemented to, when an RLF occurs, attempt to handover to a corresponding target cell in case that at least some of the measurement results before a designated period (e.g., TTT) from the time point of the RLF occurrence satisfy the entering execution condition, even if the leaving execution condition is identified later. For example, the electronic device 101 may be implemented to attempt a handover to a corresponding target cell in case that at least one of the measurement results before a designated period (e.g., TTT) from the time point of the RLF occurrence satisfies the entering execution condition.

Figure 6C:
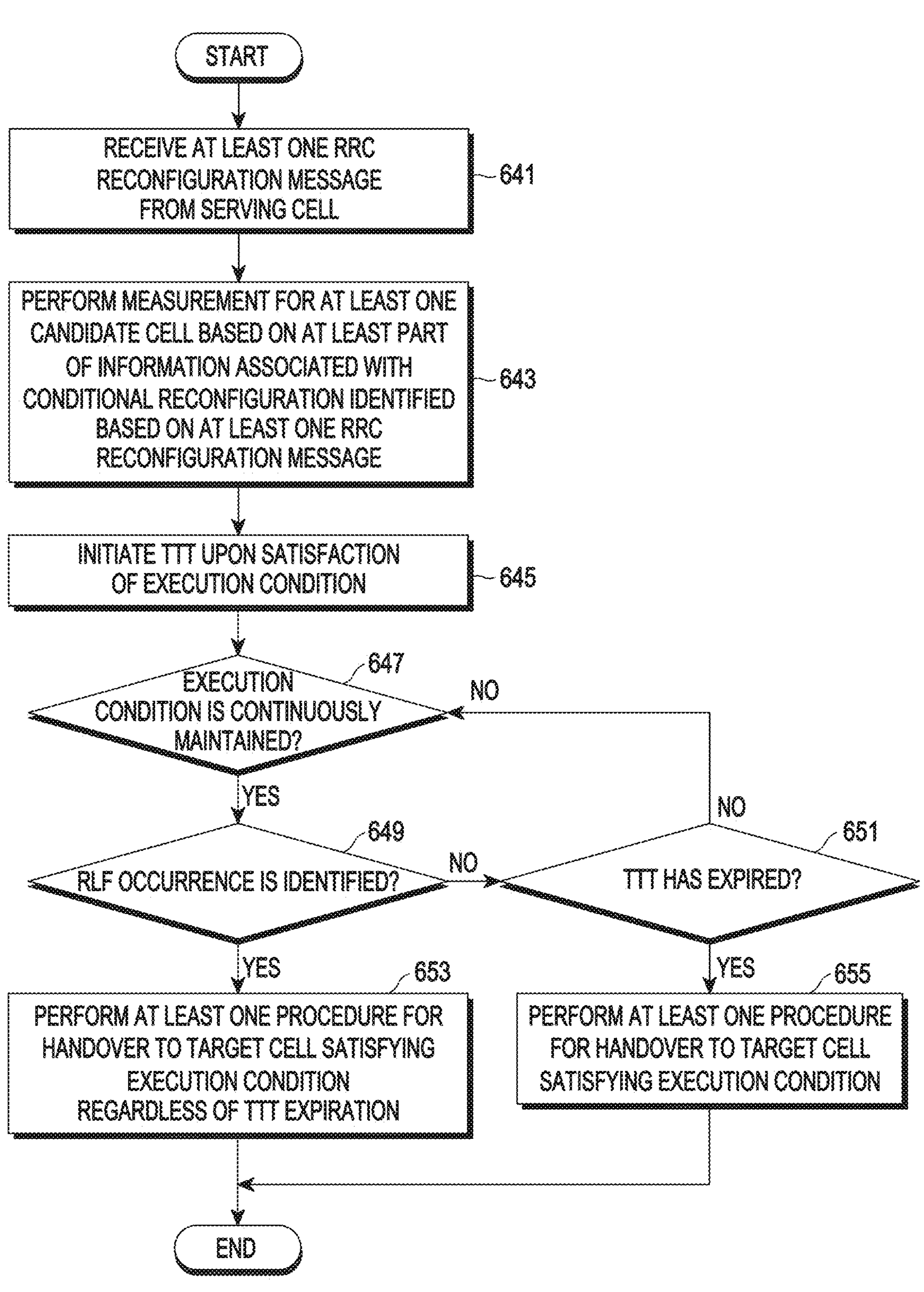
FIG. 6C is a flowchart illustrating an example method of operating an electronic device according to various embodiments.

FIG. 6C is a flowchart illustrating an example method of operating an electronic device according to various embodiments.

According to various embodiments, the electronic device 101 (e.g., at least one of the processor 120, the first communication processor 212, the second communication processor 214, or the integrated communication processor 260) may receive at least one RRC reconfiguration message from the serving cell 301 in operation 641. The electronic device 101 may measure at least one candidate cell based on at least a part of information associated with conditional reconfiguration identified based on at least one RRC reconfiguration message, in operation 643.

According to various embodiments, in operation 645, the electronic device 101 may initiate a TTT based on a measurement result satisfying an execution condition. The electronic device 101 may periodically perform measurement according to the measurement period, and in operation 647, may determine whether the periodically performed measurement result continuously maintains the execution condition. In case that the execution condition is continuously maintained ("Yes" in operation 647), the electronic device 101 may determine whether an RLF has occurred in operation 649. In case that the RLF does not occur ("No" in operation 649), the electronic device 101 may determine whether the TTT has expired in operation 651. In case that the TTT has not expired ("No" in operation 651), the electronic device 101 may determine whether the execution condition is continuously maintained in operation 647 again. When the RLF has occurred ("Yes" in operation 649), the electronic device 101 may perform at least one procedure for handover to a target cell that satisfies the execution condition regardless of TTT expiration in operation 653. Meanwhile, when the TTT has expired ("Yes" in operation 651), the electronic device 101 may perform at least one procedure for handover to a target cell that has satisfied the execution condition in operation 655.

Figure 7A:
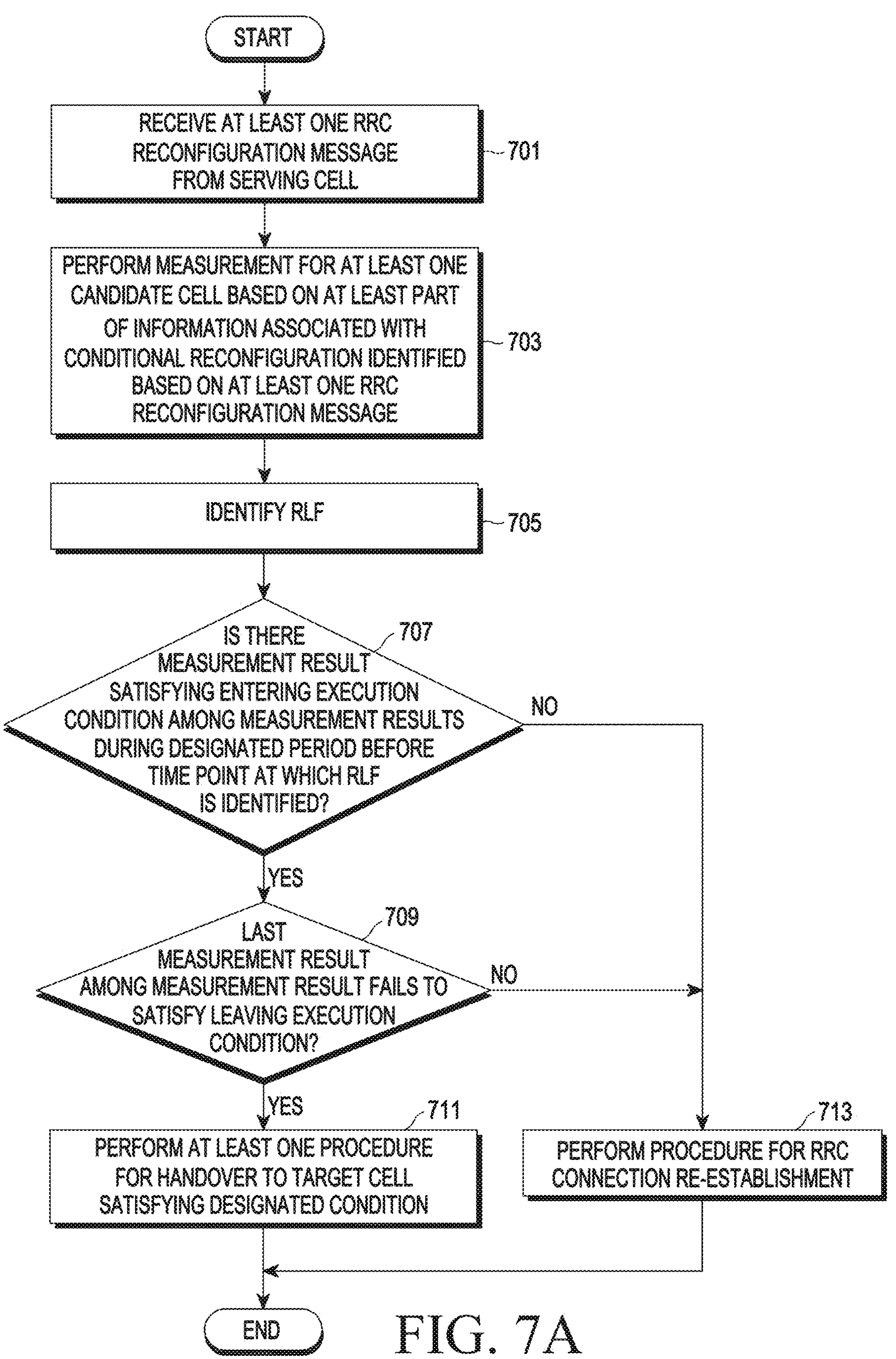
FIG. 7A is a flowchart illustrating an example method of operating an electronic device according to various embodiments.
Figure 7B:
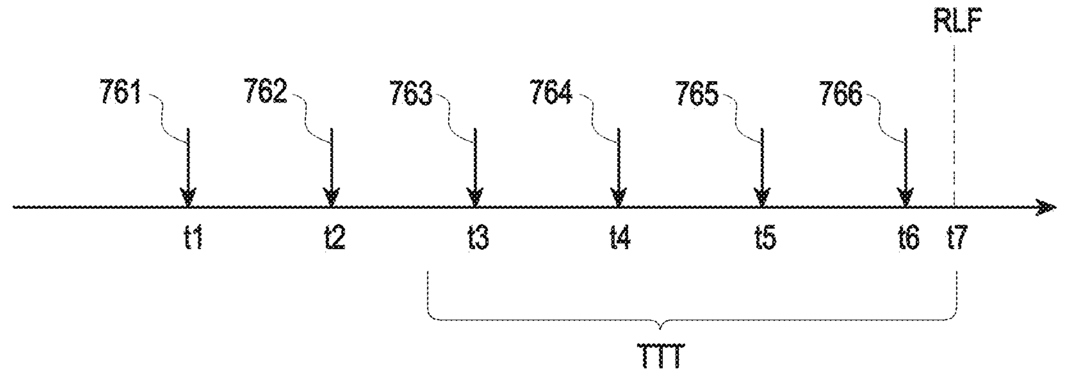
FIG. 7B is a diagram illustrating a measurement result for one measurement object according to various embodiments.

FIG. 7A is a flowchart illustrating an example method of operating an electronic device according to various embodiments. The embodiment of FIG. 7A will be described with reference to FIG. 7B. FIG. 7B is a diagram illustrating a measurement result of any one measurement object according to various embodiments.

According to various embodiments, the electronic device 101 (e.g., at least one of the processor 120, the first communication processor 212, the second communication processor 214, or the integrated communication processor 260) may receive at least one RRC reconfiguration message from the serving cell 301 in operation 701. The electronic device 101 may measure at least one candidate cell based on at least a part of information associated with conditional reconfiguration identified based on at least one RRC reconfiguration message, in operation 703. The electronic device 101 may identify an RLF while performing the measurement in operation 705. For example, referring to FIG. 7B, the electronic device 101 may identify and/or store measurement results 761, 762, 763, 764, 765, and 766 of a specific measurement object at time points t1 to t6. The electronic device 101 may identify the RLF at time point t7, for example.

According to various embodiments, the electronic device 101 may determine, in operation 707, whether a measurement result satisfying an entering execution condition exists among measurement results for a designated period before the time point at which the RLF is identified. Here, the designated period may be, for example, a TTT configured by the network, but this is only an example and the designated period is not limited thereto. For example, as shown in FIG. 7B, the electronic device 101 may determine whether there is a measurement result that satisfies the entering execution condition among the measurement results 763, 764, 765, and 766 during the TTT period before the time point t7 at which the RLF is identified. As described above, the electronic device 101 may store the measurement results 763, 764, 765, and 766 during the TTT period before the time point t7 at which the RLF is identified, and as the RLF is identified, the electronic device may determine whether there is a measurement result that satisfies the entering execution condition among the measurement results 763, 764, 765, and 766. In case that there is a measurement result that satisfies the entering execution condition ("Yes" in operation 707), the electronic device 101 may determine whether at least one of the measurement results fails to satisfy a leaving execution condition in operation 709. For example, as shown in FIG. 7B, the electronic device 101 may determine whether at least one of the measurement results 763, 764, 765, and 766 during the TTT period before the time point t7 at which the RLF is identified fails to satisfy the leaving execution condition. In case that at least one of the measurement results fails to satisfy the leaving execution condition ("Yes" in operation 709), the electronic device 101 may perform at least one procedure for handover to a target cell that satisfies the execution condition in operation 711. For example, the electronic device 101 may transmit a RACH preamble message, receive a RAR message, and/or transmit an RRC connection re-establishment complete message to a target cell corresponding to a measurement object that maintains satisfaction of an execution condition until the time point of identification of the RLF. In case that at least one of the measurement results satisfies the leaving execution condition ("No" in operation 709), the electronic device 101 may perform a procedure for re-establishing an RRC connection in operation 713. For example, the electronic device 101 may perform cell search and/or cell selection and may perform a procedure for re-establishing an RRC connection. Alternatively, the electronic device 101 may transmit an MCG failure message or an SCG failure message.

Meanwhile, in an embodiment, the electronic device 101 may be implemented to, in case that at least one of the measurement results 763,764,765, and 766 during the TTT period before the time point t7 at which the RLF is identified satisfies the entering execution condition, perform a procedure for handover to a target cell corresponding to the measurement object even if there is a measurement result, among the measurement results 763,764,765, and 766, that satisfies the leaving execution condition. Alternatively, in an embodiment, the electronic device 101 may be implemented to, based on that at least one of the measurement results 763,764,765, and 766 during the TTT period before the time point t7 at which the RLF is identified satisfies the entering execution condition, and a measurement result 766 just before the time point t7 at which the RLF is identified fails to satisfy the leaving execution condition, perform a procedure for handover to a target cell corresponding to the measurement object.

Figure 8A:
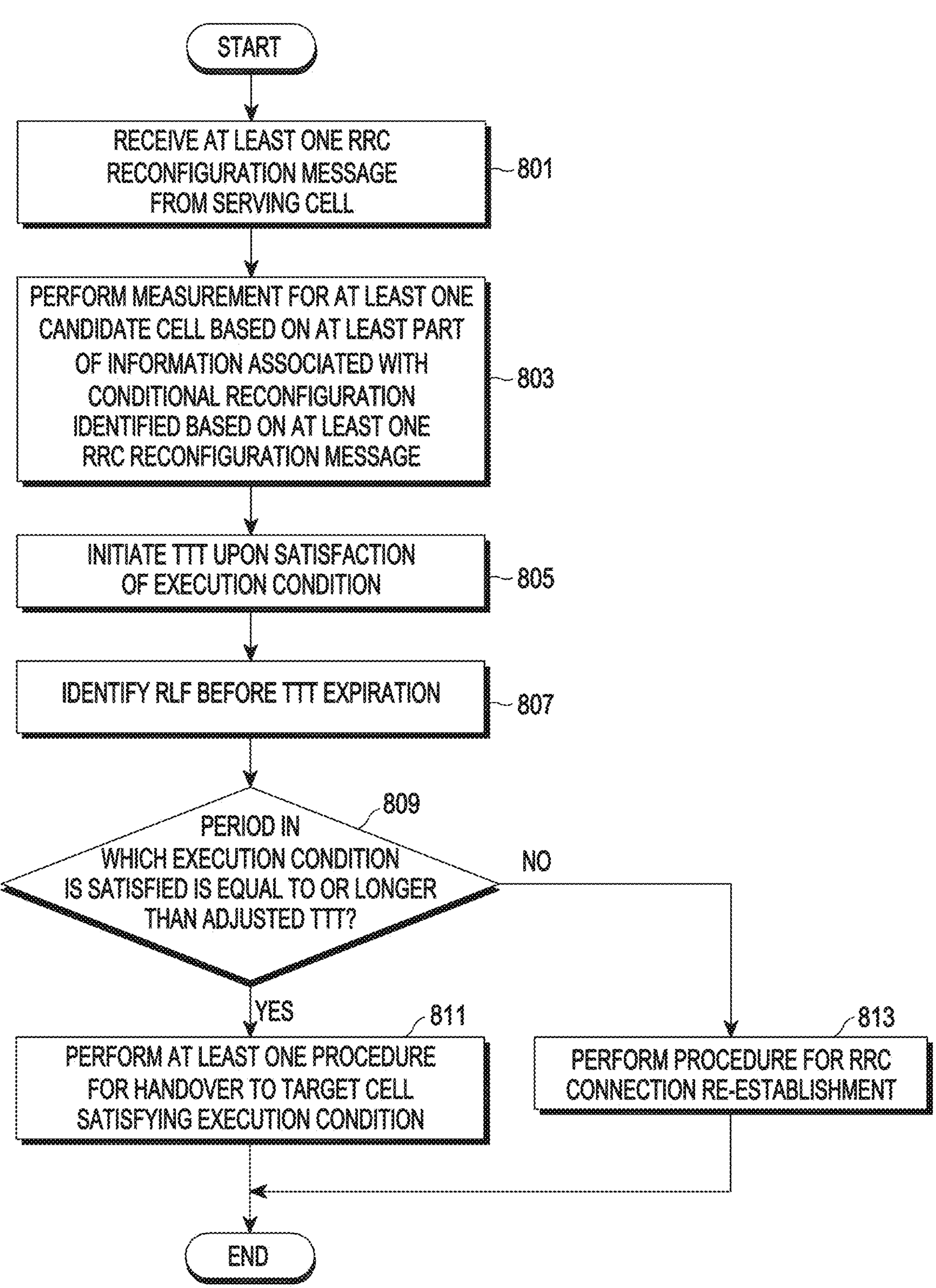
FIG. 8A is a flowchart illustrating an example method of operating an electronic device according to various embodiments.

FIG. 8A is a flowchart illustrating an example method of operating an electronic device according to various embodiments.

According to various embodiments, the electronic device 101 (e.g., at least one of the processor 120, the first communication processor 212, the second communication processor 214, or the integrated communication processor 260) may receive at least one RRC reconfiguration message from a serving cell in operation 801. The electronic device 101 may measure at least one candidate cell based on at least a part of information associated with conditional reconfiguration identified based on at least one RRC reconfiguration message, in operation 803. As described above, after performing MR, the electronic device 101 may receive at least one RRC reconfiguration message for conditional reconfiguration from the serving cell 301. The electronic device 101 may identify information associated with conditional reconfiguration based on at least one RRC reconfiguration message received before and/or after performing MR.

According to various embodiments, the electronic device 101 may initiate a TTT when a measurement result satisfies an execution condition (e.g., an entering execution condition), in operation 805. The electronic device 101 may identify the RLF before the TTT expires, in operation 807. In operation 809, the electronic device 101 may determine whether a period in which the execution condition is satisfied is equal to or longer than an adjusted TTT. Here, the adjusted TTT may be shorter than the TTT configured by the network. For example, in 3GPP, 40 ms, 64 ms, 80 ms, 100 ms, 128 ms, 160 ms, 256 ms, 320 ms, 480 ms, 512 ms, 640 ms, 1024 ms, and 1280 ms are disclosed as TTT values. For example, the electronic device may receive an RRC reconfiguration message including any one of the above-described values for a specific execution condition (e.g., A3 event). For example, when the electronic device 101 is configured with a TTT of 640 ms from the network, the electronic device 101 may configure the adjusted TTT to be a value shorter than 640 ms. For example, the electronic device 101 may select a value shorter than 640 ms among values allowed in 3GPP, or may configure a value, even if it is a value other than values disclosed in 3GPP, to be shorter than a value configured by the network. For example, the electronic device 101 may perform an operation such as a division operation or subtraction operation on the value configured by the network so as to obtain a value shorter than a value configured by the network, and there is no limitation to the operation. For example, the electronic device 101 may determine whether a period from just after the time point of satisfaction of the entering execution condition to the time point of satisfaction of the leaving execution condition is equal to or longer than the adjusted TTT. In case that the leaving execution condition is not satisfied until the RLF occurs, the electronic device 101 may determine whether a period from just after the time point of satisfaction of the entering execution condition to the time point of occurrence of the RLF is equal to or longer than the adjusted TTT. In case that a period in which the execution condition is satisfied is equal to or longer than the adjusted TTT ("Yes" in operation 809), the electronic device 101 may perform at least one procedure for handover to the target cell satisfying the execution condition in operation 811. In case that a period in which the execution condition is satisfied is shorter than the adjusted TTT ("No" in operation 809), the electronic device 101 may perform a procedure for re-establishing an RRC connection in operation 813. Alternatively, the electronic device 101 may transmit an MCG failure message or an SCG failure message. For example, even if the entering execution condition is satisfied, handover may not be performed in case that the period of the execution maintenance is shorter than the TTT.

Figure 8B:
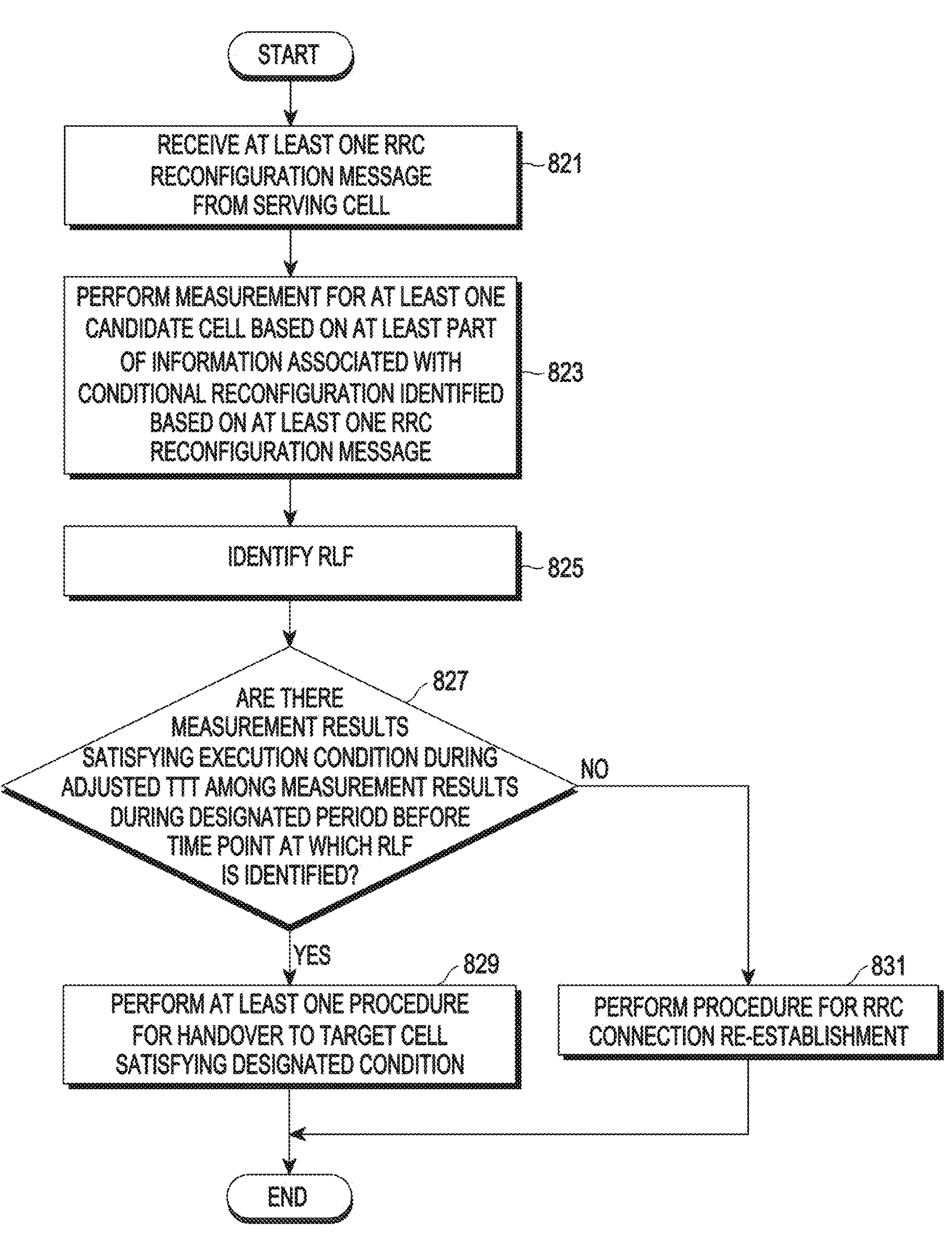
FIG. 8B is a flowchart illustrating an example method of operating an electronic device according to various embodiments.
Figure 8C:
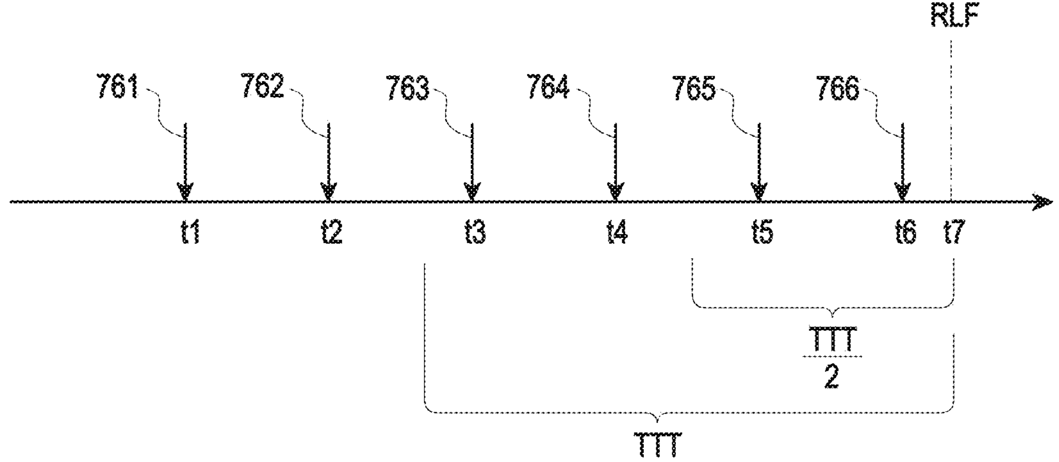
FIG. 8C is a diagram illustrating a measurement result for one measurement object according to various embodiments.

FIG. 8B is a flowchart illustrating an example method of operating an electronic device according to various embodiments. The embodiment of FIG. 8B will be described with reference to FIG. 8C. FIG. 8C is a diagram illustrating a measurement result of one measurement object according to various embodiments.

According to various embodiments, the electronic device 101 (e.g., at least one of the processor 120, the first communication processor 212, the second communication processor 214, or the integrated communication processor 260) may receive at least one RRC reconfiguration message from a serving cell in operation 821. The electronic device 101 may measure at least one candidate cell based on at least a part of information associated with conditional reconfiguration identified based on at least one RRC reconfiguration message, in operation 823. As described above, after performing MR, the electronic device 101 may receive at least one RRC reconfiguration message for conditional reconfiguration from the serving cell 301. The electronic device 101 may identify information associated with conditional reconfiguration based on at least one RRC reconfiguration message received before and/or after performing MR.

According to various embodiments, the electronic device 101 may identify the RLF in operation 825. In operation 827, the electronic device 101 may determine whether there are measurement results that satisfy the execution condition during the adjusted TTT among the measurement results for a designated period before the time point at which the RLF is identified. For example, referring to FIG. 8C, the electronic device 101 may determine whether a period, in which a measurement result that satisfies execution conditions among the measurement results 763, 764, 765, and 766, is equal to or longer than the adjusted TTT. For example, the electronic device 101 may determine whether a period from just after the time point of satisfaction of the entering execution condition to the time point of satisfaction of the leaving execution condition or a period from just after the time point of satisfaction of the entering execution condition to the time point of identification of the RLF is equal to or longer than the adjusted TTT. In case that there are measurement results that satisfy the execution condition during the adjusted TTT among the measurement results for a designated period before the time point at which the RLF is identified ("Yes" in operation 827), the electronic device 101 may perform at least one procedure for handover to a target cell that satisfies the designated condition in operation 829. In case that there is no measurement result satisfying the execution condition during the adjusted TTT among the measurement results for a designated period before the time point at which the RLF is identified ("No" in operation 827), the electronic device 101 may perform a procedure for RRC connection re-establishment in operation 831. Alternatively, the electronic device 101 may transmit an MCG failure message or an SCG failure message.

Alternatively, as shown in FIG. 8C, the electronic device 101 may be implemented to perform handover based on that all or some of the measurement results 765 and 766, obtained during the adjusted TTT (e.g., TTT/2) from the time point t7 at which the RLF occurs, fail to satisfy the leaving execution condition. On the other hand, the division operation for the TTT in FIG. 8C is a non-limiting example.

Figure 8D:
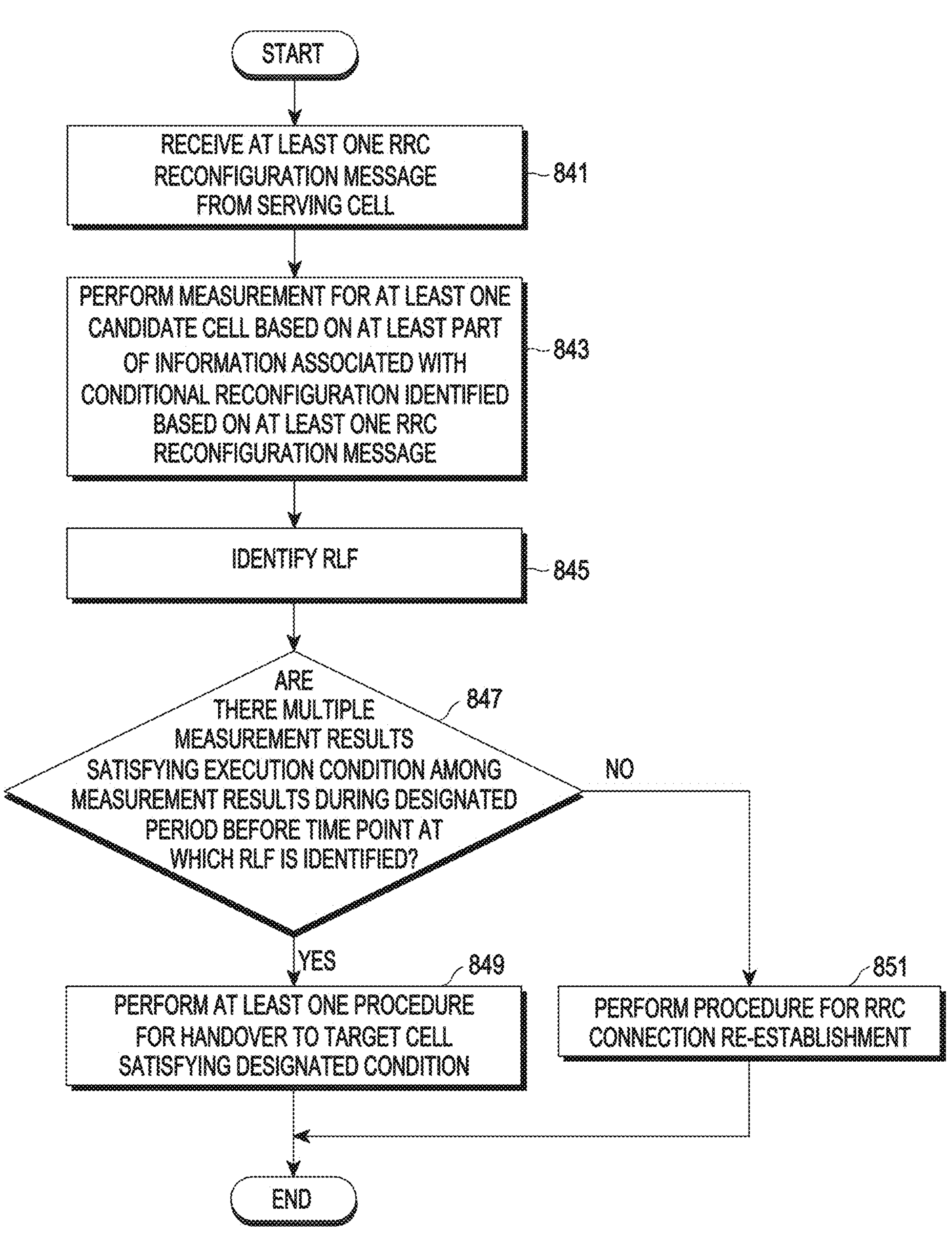
FIG. 8D is a flowchart illustrating an example method of operating an electronic device according to various embodiments.

FIG. 8D is a flowchart illustrating an example method of operating an electronic device according to various embodiments.

According to various embodiments, the electronic device 101 (e.g., at least one of the processor 120, the first communication processor 212, the second communication processor 214, or the integrated communication processor 260) may receive at least one RRC reconfiguration message from a serving cell in operation 841. The electronic device 101 may measure at least one candidate cell based on at least a part of information associated with conditional reconfiguration identified based on at least one RRC reconfiguration message, in operation 843. As described above, after performing MR, the electronic device 101 may receive at least one RRC reconfiguration message for conditional reconfiguration from the serving cell 301. The electronic device 101 may identify information associated with conditional reconfiguration based on at least one RRC reconfiguration message received before and/or after performing MR.

According to various embodiments, the electronic device 101 may identify the RLF in operation 845. In operation 847, the electronic device 101 may determine whether there are multiple measurement results satisfying the execution condition among the measurement results for a designated period before the time point at which the RLF is identified. In an example, the electronic device 101 may determine whether there are multiple measurement results satisfying an execution condition among the measurement results during the TTT before the RLF is identified. For example, the electronic device 101 may determine whether there is a first measurement result that satisfies an entering execution condition and at least one second measurement result that fails to satisfy a leaving execution condition, after the first measurement result, among measurement results. However, this is illustrative and there is no limitation on conditions for identifying multiple measurement results among the measurement results during the TTT. For example, the electronic device 101 may be implemented to perform a handover procedure if multiple measurement results satisfy the entering execution condition and/or leaving execution condition. In case that there are multiple measurement results that satisfy the execution condition among the measurement results for a designated period ("Yes" in operation 847), the electronic device 101 may perform at least one procedure for handover to the target cell that satisfies the designated condition in operation 849. In case that there are no multiple measurement results satisfying the execution condition among measurement results for a designated period ("No" in operation 847), the electronic device 101 may perform a procedure for RRC connection re-establishment in operation 851. Alternatively, the electronic device 101 may transmit an MCG failure message or an SCG failure message.

According to various embodiments, the electronic device 101 may be configured to perform handover based on conditional reconfiguration in case that the number of measurement results satisfying an execution condition among measurement results for a designated period before the time point at which the RLF is identified is equal to or greater than a designated number. For example, the electronic device 101 may be configured to perform handover based on conditional reconfiguration in case that the total number of first measurement results satisfying the entering execution condition and at least one second measurement result that fails to satisfy a leaving execution condition, after the first measurement result, among measurement results is greater than or equal to a designated number. Alternatively, the electronic device 101 may be configured to perform handover based on conditional reconfiguration in case that the number of measurement results satisfying the entering execution condition and/or the leaving execution condition among the measurement results for a designated period before the time point at which the RLF is identified is equal to or greater than a designated number. The designated number may be configured, for example, based on a measurement gap configured by the network. For example, the shorter the measurement gap is configured, the larger the designated number of measurement results may be configured.

Figure 9A:
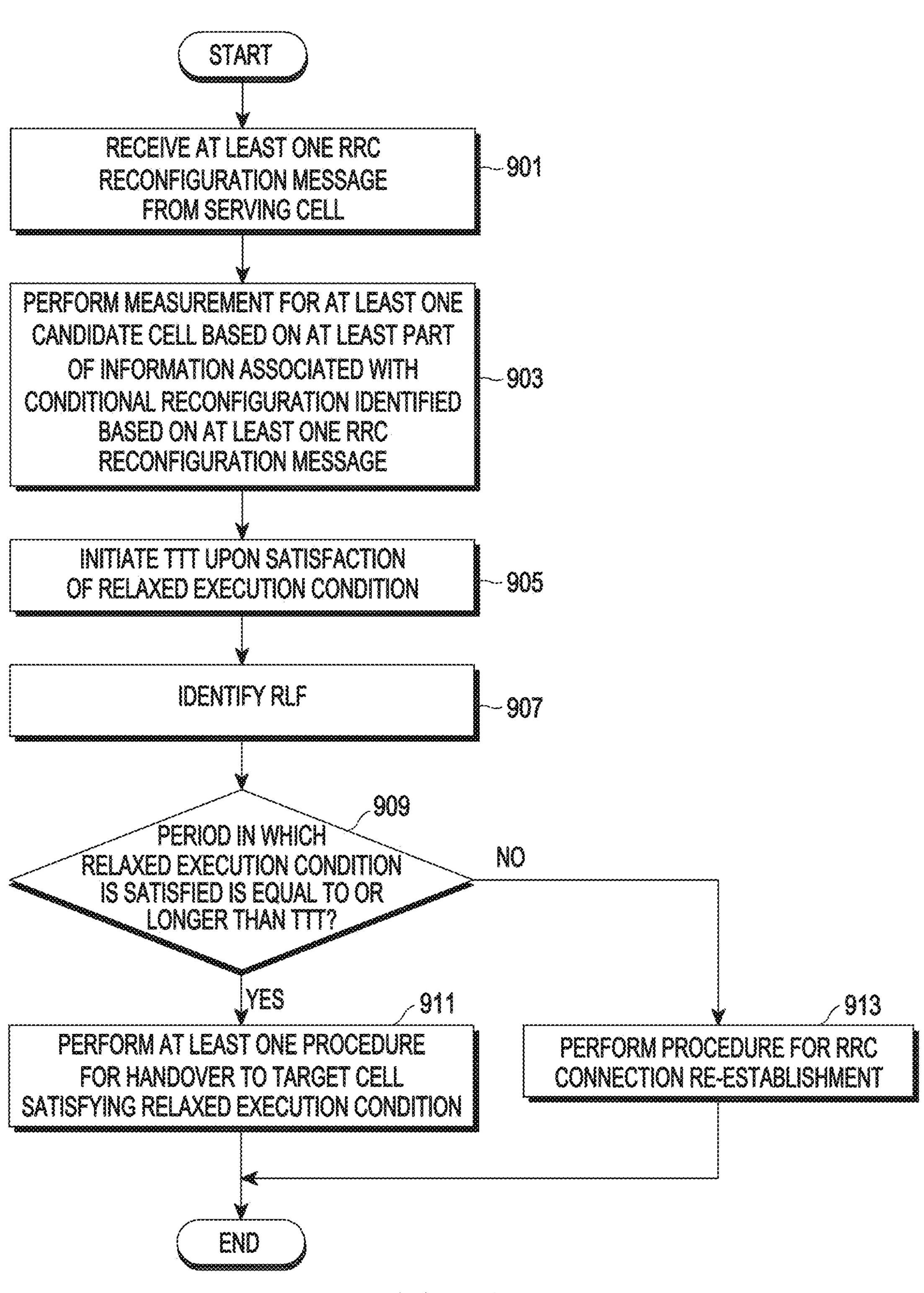
FIG. 9A is a flowchart illustrating an example method of operating an electronic device according to various embodiments.

FIG. 9A is a flowchart illustrating an example method of operating an electronic device according to various embodiments.

According to various embodiments, the electronic device 101 (e.g., at least one of the processor 120, the first communication processor 212, the second communication processor 214, or the integrated communication processor 260) may receive at least one RRC reconfiguration message from a serving cell in operation 901. The electronic device 101 may measure at least one candidate cell based on at least a part of information associated with conditional reconfiguration identified based on at least one RRC reconfiguration message, in operation 903. As described above, after performing MR, the electronic device 101 may receive at least one RRC reconfiguration message for conditional reconfiguration from the serving cell 301. The electronic device 101 may identify information associated with conditional reconfiguration based on at least one RRC reconfiguration message received before and/or after performing MR.

According to various embodiments, the electronic device 101 may initiate a TTT according to satisfaction of a relaxed execution condition in operation 905. The relaxed execution condition may be configured based on an execution condition configured by a network. For example, in case that an offset of A3 event configured by the network is 8 dB, the offset of the A3 event of the relaxed execution condition may be 4 dB. Accordingly, the minimum value of the reception strength capable of satisfying a relaxed entering execution condition may be smaller than the minimum value of the reception signal strength capable of satisfying an entering execution condition configured by the network. In addition, the minimum value of the reception strength that fails to satisfy a relaxed leaving execution condition may be smaller than the minimum value of the reception strength that fails to satisfy a leaving execution condition configured by the network. For example, in case that the RSRP measurement result for a source cell is −100 dBm and the RSRP measurement result for a specific target cell is −97 dBm, the relaxed entering execution condition may be satisfied even when the entering execution condition of the A3 event is not satisfied. For example, at least one threshold (e.g., Threshold 1) for a relaxed A5 event may be higher than at least one threshold (e.g., Threshold 1) for A5 event configured by the network. In another example, at least one threshold (e.g., Threshold 2) for the relaxed A5 event may be lower than at least one threshold (e.g., Threshold 2) for the A5 event configured by the network. Meanwhile, the foregoing is merely illustrative, and a condition that may be satisfied by a reception strength failing to satisfy the entering execution condition configured by the network may be configured as a relaxed entering execution condition. Further, there is no limitation to parameters to be adjusted.

According to various embodiments, the electronic device 101 may also determine whether the relaxed execution condition is satisfied while determining whether the execution condition configured by the network is satisfied. In operation 907, the electronic device 101 may identify the RLF. In operation 909, the electronic device 101 may determine whether a period in which the relaxed execution condition is satisfied is equal to or longer than the TTT. In case that a period in which the relaxed execution condition is satisfied is equal to or longer than the TTT ("Yes" in operation 909), the electronic device 101 may perform at least one procedure for handover to a target cell satisfying the relaxed execution condition in operation 911. When a period in which the relaxed execution condition is satisfied is shorter than the TTT ("No" in operation 909), the electronic device 101 may perform a procedure for re-establishing the RRC connection in operation 913. Alternatively, the electronic device 101 may transmit an MCG failure message or an SCG failure message.

As described above, the electronic device 101 may attempt handover in case that a period in which the relaxed execution condition is satisfied is equal to or longer than the TTT even if the execution condition configured by the network is not satisfied. Even in case that the relaxed execution condition is satisfied, the possibility of network access may be relatively high. Accordingly, there may be a relatively high possibility that the network access time is shortened compared to a case in which the cell search and/or cell selection and RRC connection re-establishment procedures of the comparative example are performed.

Figure 9B:
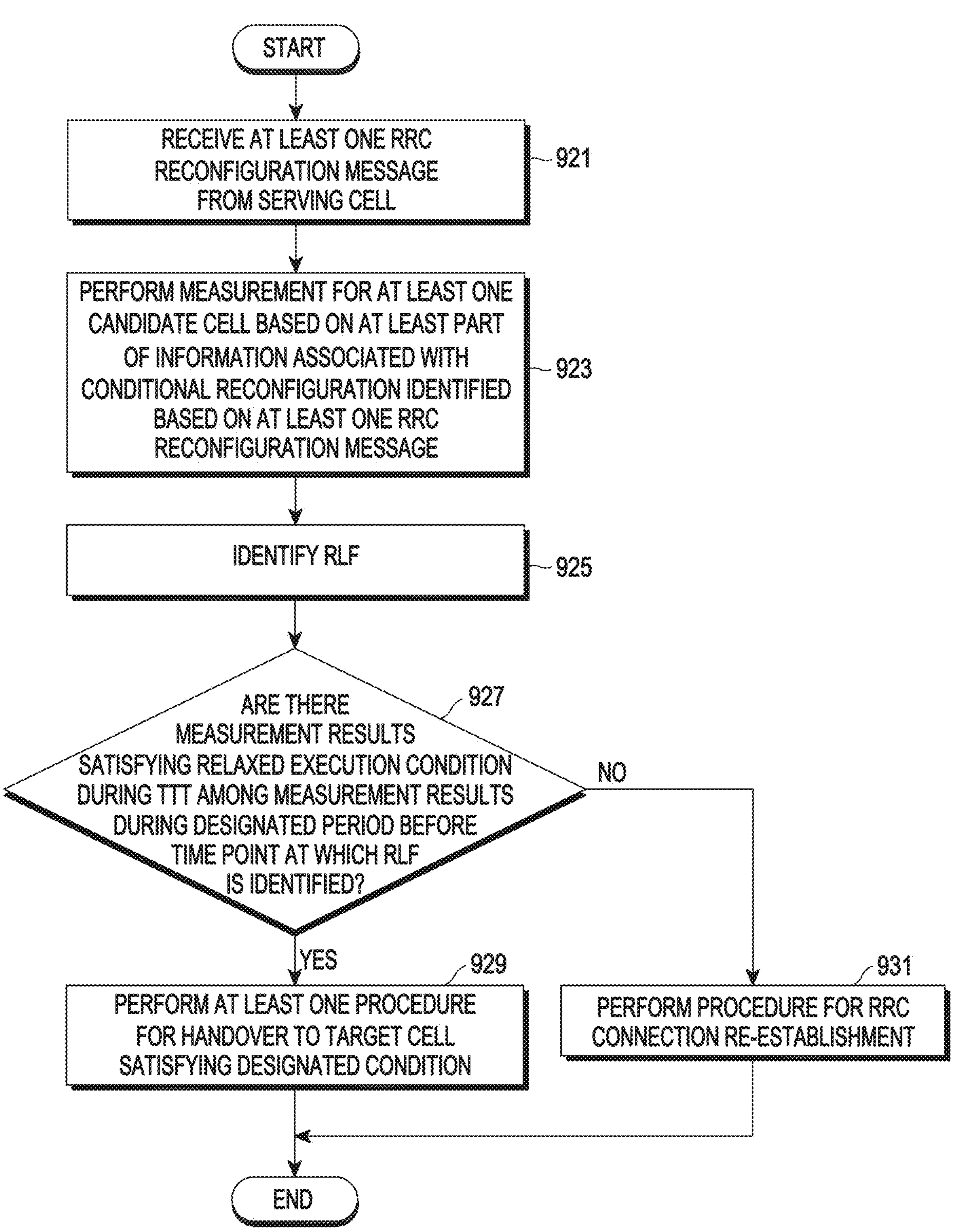
FIG. 9B is a flowchart illustrating an example method of operating an electronic device according to various embodiments.

FIG. 9B is a flowchart illustrating an example method of operating an electronic device according to various embodiments.

According to various embodiments, the electronic device 101 (e.g., at least one of the processor 120, the first communication processor 212, the second communication processor 214, or the integrated communication processor 260) may receive at least one RRC reconfiguration message from a serving cell in operation 921. The electronic device 101 may measure at least one candidate cell based on at least a part of information associated with conditional reconfiguration identified based on at least one RRC reconfiguration message, in operation 923. As described above, after performing MR, the electronic device 101 may receive at least one RRC reconfiguration message for conditional reconfiguration from the serving cell 301. The electronic device 101 may identify information associated with conditional reconfiguration based on at least one RRC reconfiguration message received before and/or after performing MR.

According to various embodiments, the electronic device 101 may identify the RLF in operation 925. In operation 927, the electronic device 101 may determine whether there are measurement results satisfying the relaxed execution condition during TTT among the measurement results for a designated period before the time point at which the RLF is identified. For example, the electronic device 101 may determine whether there are measurement results satisfying the relaxed execution condition during TTT, among measurement results (obtained) during TTT before the time point at which the RLF is identified or a period longer than the TTT. The relaxed execution conditions herein may be at least partially the same as those described in FIG. 9A, for example. For example, the electronic device 101 may determine a period between the time point at which the relaxed entering execution condition is satisfied and the time point at which the relaxed leaving execution condition is satisfied, or a period between the time point at which the relaxed entering execution condition is satisfied and the time point at which the RLF occurs is equal to or longer than the TTT. Alternatively, the electronic device 101 may determine whether a period in which the relaxed entering execution condition and/or the relaxed leaving execution condition is satisfied is equal to or longer than the TTT. In case that there are measurement results satisfying the relaxed execution condition during the TTT (or more) among the measurement results ("Yes" in operation 927), the electronic device 101 may perform at least one procedure for handover to a target cell that satisfies the designated condition in operation 929. In case that there are no measurement results that satisfy the relaxed execution condition during the TTT among the measurement results ("No" in operation 927), the electronic device 101 may perform a procedure for re-establishing the RRC connection in operation 931. Alternatively, the electronic device 101 may transmit an MCG failure message or an SCG failure message.

Figure 10A:
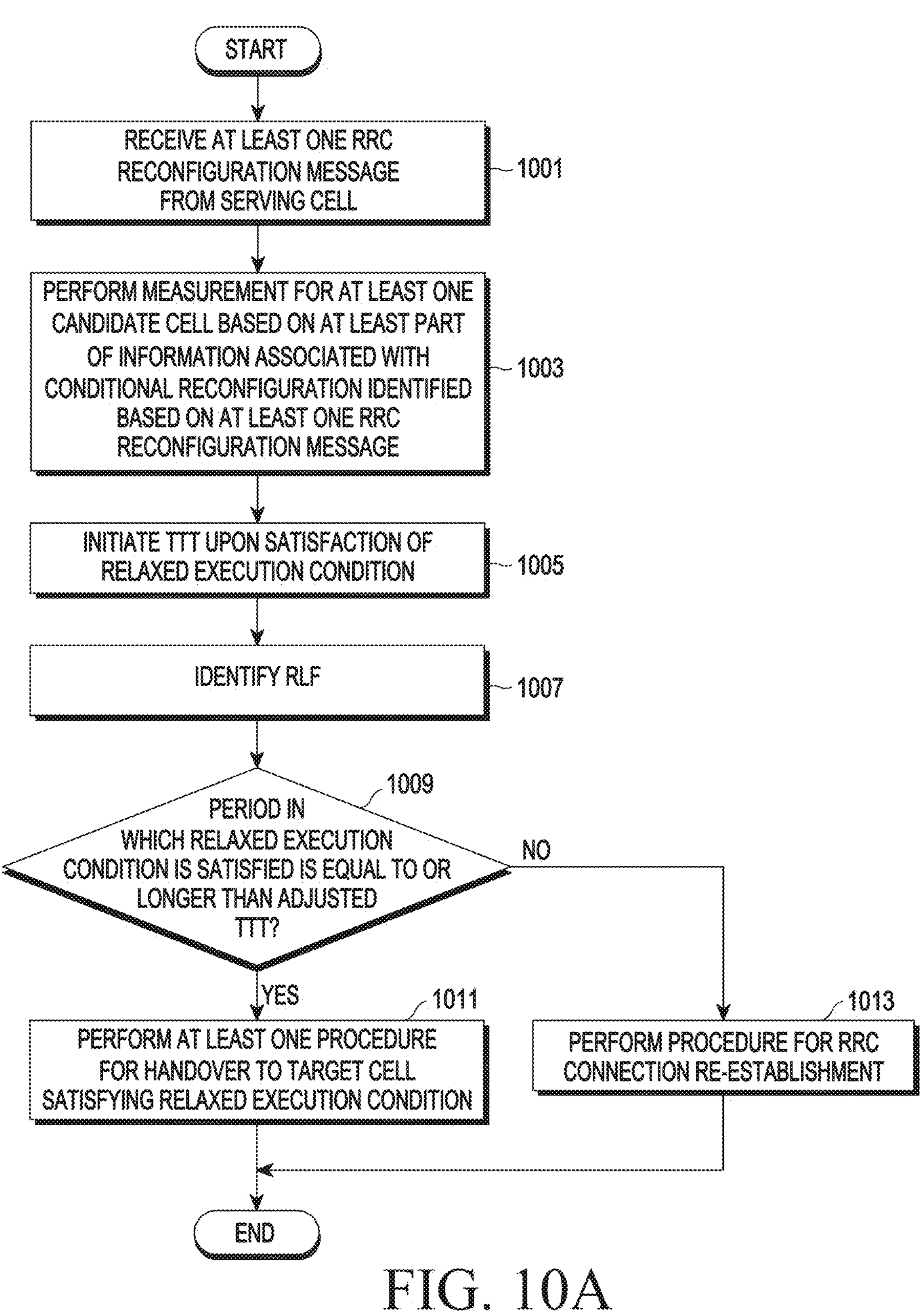
FIG. 10A is a flowchart illustrating an example method of operating an electronic device according to various embodiments.

FIG. 10A is a flowchart illustrating an example method of operating an electronic device according to various embodiments.

According to various embodiments, the electronic device 101 (e.g., at least one of the processor 120, the first communication processor 212, the second communication processor 214, or the integrated communication processor 260) may receive at least one RRC reconfiguration message from a serving cell in operation 1001. The electronic device 101 may measure at least one candidate cell based on at least a part of information associated with conditional reconfiguration identified based on at least one RRC reconfiguration message, in operation 1003. As described above, after performing MR, the electronic device 101 may receive at least one RRC reconfiguration message for conditional reconfiguration from the serving cell 301. The electronic device 101 may identify information associated with conditional reconfiguration based on at least one RRC reconfiguration message received before and/or after performing MR.

According to various embodiments, in operation 1005, the electronic device 101 may initiate a TTT according to satisfaction of a relaxed execution condition. The relaxed execution conditions may be at least partially the same as those described with reference to FIG. 9A. According to various embodiments, the electronic device 101 may also determine whether the relaxed execution condition is satisfied while determining whether the execution condition configured by the network is satisfied. In operation 1007, the electronic device 101 may identify the RLF. In operation 1009, the electronic device 101 may determine whether a period in which the relaxed execution condition is satisfied is equal to or longer than an adjusted TTT. Here, the adjusted TTT may be shorter than the TTT configured by the network. For example, the electronic device 101 may select a value shorter than a value configured by the network among values initiated by 3GPP, or may configure a value to be shorter than a value configured by the network even if it is a value other than values disclosed by 3GPP. In case that a period in which the relaxed execution condition is satisfied is equal to or longer than the adjusted TTT ("Yes" in operation 1009), the electronic device 101 may perform at least one procedure for handover to a target cell satisfying the relaxed execution condition in operation 1011. In case that a period in which the relaxed execution condition is satisfied is shorter than the adjusted TTT ("No" in operation 1009), the electronic device 101 may perform a procedure for re-establishing the RRC connection in operation 1013. Alternatively, the electronic device 101 may transmit an MCG failure message or an SCG failure message.

Figure 10B:
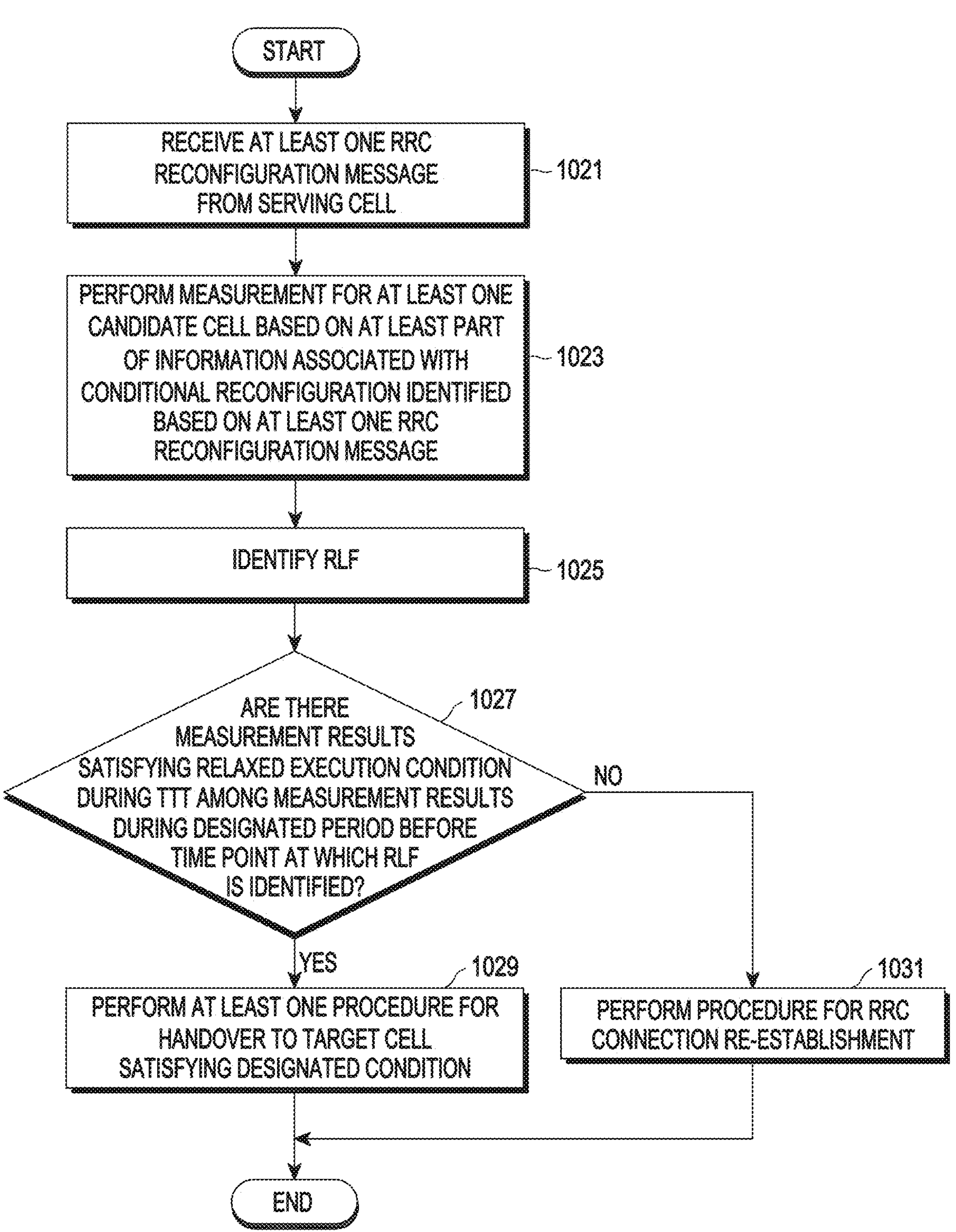
FIG. 10B is a flowchart illustrating an example method of operating an electronic device according to various embodiments.

FIG. 10B is a flowchart illustrating an example method of operating an electronic device according to various embodiments.

According to various embodiments, the electronic device 101 (e.g., at least one of the processor 120, the first communication processor 212, the second communication processor 214, or the integrated communication processor 260) may receive at least one RRC reconfiguration message from a serving cell in operation 1021. The electronic device 101 may measure at least one candidate cell based on at least a part of information associated with conditional reconfiguration identified based on at least one RRC reconfiguration message, in operation 1023. As described above, after performing MR, the electronic device 101 may receive at least one RRC reconfiguration message for conditional reconfiguration from the serving cell 301. The electronic device 101 may identify information associated with conditional reconfiguration based on at least one RRC reconfiguration message received before and/or after performing MR.

According to various embodiments, the electronic device 101 may identify the RLF in operation 1025. In operation 1027, the electronic device 101 may determine whether there are measurement results satisfying the relaxed execution condition during the adjusted TTT among the measurement results for a designated period before the time point at which the RLF is identified. For example, the electronic device 101 may determine whether there are measurement results satisfying the relaxed execution condition during the adjusted TTT, among measurement results during TTT before the time point at which the RLF is identified or a period longer than the TTT. For example, the electronic device 101 may determine a period between the time point at which the relaxed entering execution condition is satisfied and the time point at which the relaxed leaving execution condition is satisfied, or a period between the time point at which the relaxed entering execution condition is satisfied and the time point at which the RLF occurs is equal to or longer than the adjusted TTT. Alternatively, the electronic device 101 may determine whether a period in which the relaxed entering execution condition and/or the relaxed leaving execution condition is satisfied is equal to or longer than the adjusted TTT. In case that there are measurement results satisfying the relaxed execution condition during the adjusted TTT among the measurement results ("Yes" in operation 1027), the electronic device 101 may perform at least one procedure for handover to a target cell that satisfies the designated condition in operation 1029. In case that there are no measurement results that satisfy the relaxed execution condition during the adjusted TTT among the measurement results ("No" in operation 1027), the electronic device 101 may perform a procedure for re-establishing the RRC connection in operation 1031. Alternatively, the electronic device 101 may transmit an MCG failure message or an SCG failure message.

Figure 11:
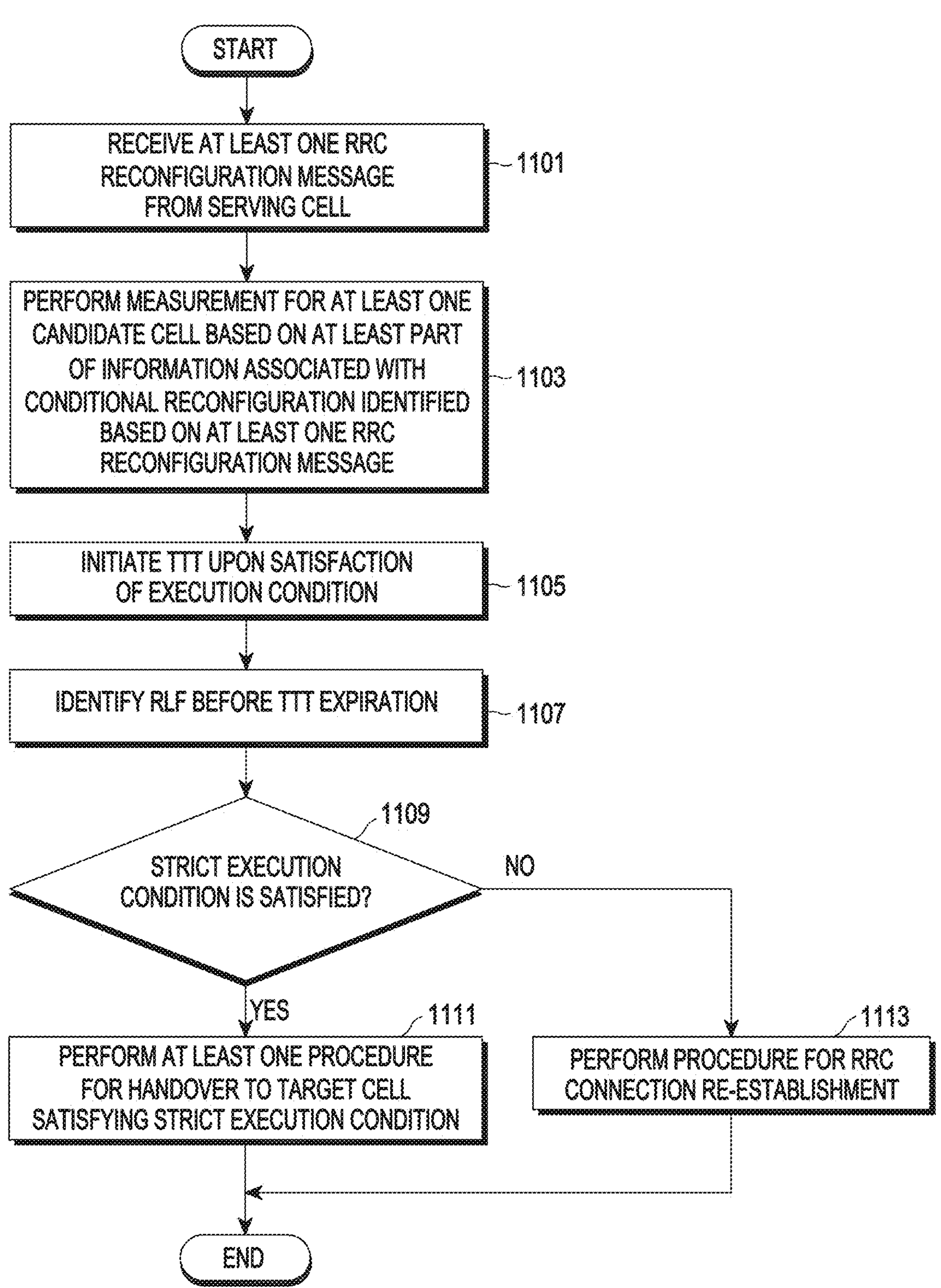
FIG. 11 is a flowchart illustrating an example method of operating an electronic device according to various embodiments.

FIG. 11 is a flowchart illustrating an example method of operating an electronic device according to various embodiments.

According to various embodiments, the electronic device 101 (e.g., at least one of the processor 120, the first communication processor 212, the second communication processor 214, or the integrated communication processor 260) may receive at least one RRC reconfiguration message from a serving cell in operation 1101. The electronic device 101 may measure at least one candidate cell based on at least a part of information associated with conditional reconfiguration identified based on at least one RRC reconfiguration message, in operation 1103. As described above, after performing MR, the electronic device 101 may receive at least one RRC reconfiguration message for conditional reconfiguration from the serving cell 301. The electronic device 101 may identify information associated with conditional reconfiguration based on at least one RRC reconfiguration message received before and/or after performing MR.

According to various embodiments, the electronic device 101 may initiate a TTT according to satisfaction of an execution condition in operation 1105. The electronic device 101 may identify the RLF before the TTT expires in operation 1107. In operation 1109, the electronic device 101 may determine whether a strict execution condition is satisfied. The strict execution condition may be configured based on the execution condition configured by the network. For example, when the offset of the A3 event configured by the network is 8 dB, the offset of the A3 event of the strict execution condition may be 10 dB. Accordingly, the minimum value of the reception strength capable of satisfying the strict entering execution condition may be greater than the minimum value of the reception strength capable of satisfying the entering execution condition configured by the network. In addition, the minimum value of the reception strength that fails to satisfy the strict leaving execution condition may be greater than the minimum value of the reception strength that fails to satisfy the leaving execution condition configured by the network. For example, Threshold 1 of the strict A5 event may be lower than Threshold 1 of the A5 event configured by the network, and Threshold 2 of the strict A5 event may be greater than Threshold 2 of the A5 event configured by the network. Meanwhile, the foregoing is merely illustrative, and in case that the reception strength that fails to satisfy the strict entering execution condition satisfies the entering execution condition configured by the network, there is no limitation thereto.

According to various embodiments, the electronic device 101 may determine whether the strict execution condition is satisfied in operation 1109. When the strict execution condition is satisfied ("Yes" in operation 1109), the electronic device 101 may perform at least one procedure for handover to a target cell satisfying the strict execution condition in operation 1111. In case that the strict execution condition is not satisfied ("No" in operation 1109), the electronic device 101 may perform a procedure for re-establishing the RRC connection in operation 1113. Alternatively, the electronic device 101 may transmit an MCG failure message or an SCG failure message.

Satisfaction of the strict execution condition may refer, for example, to the probability in which successful access being relatively high, and thus the electronic device 101 may be configured to perform handover to a corresponding cell without considering the time of satisfaction of the strict execution condition. However, in an embodiment, the electronic device 101 is configured to perform handover to a corresponding cell in case that the time of satisfaction of the strict execution condition is longer than a TTT that is adjusted to be shorter than, for example, a TTT configured by the network.

Figure 12:
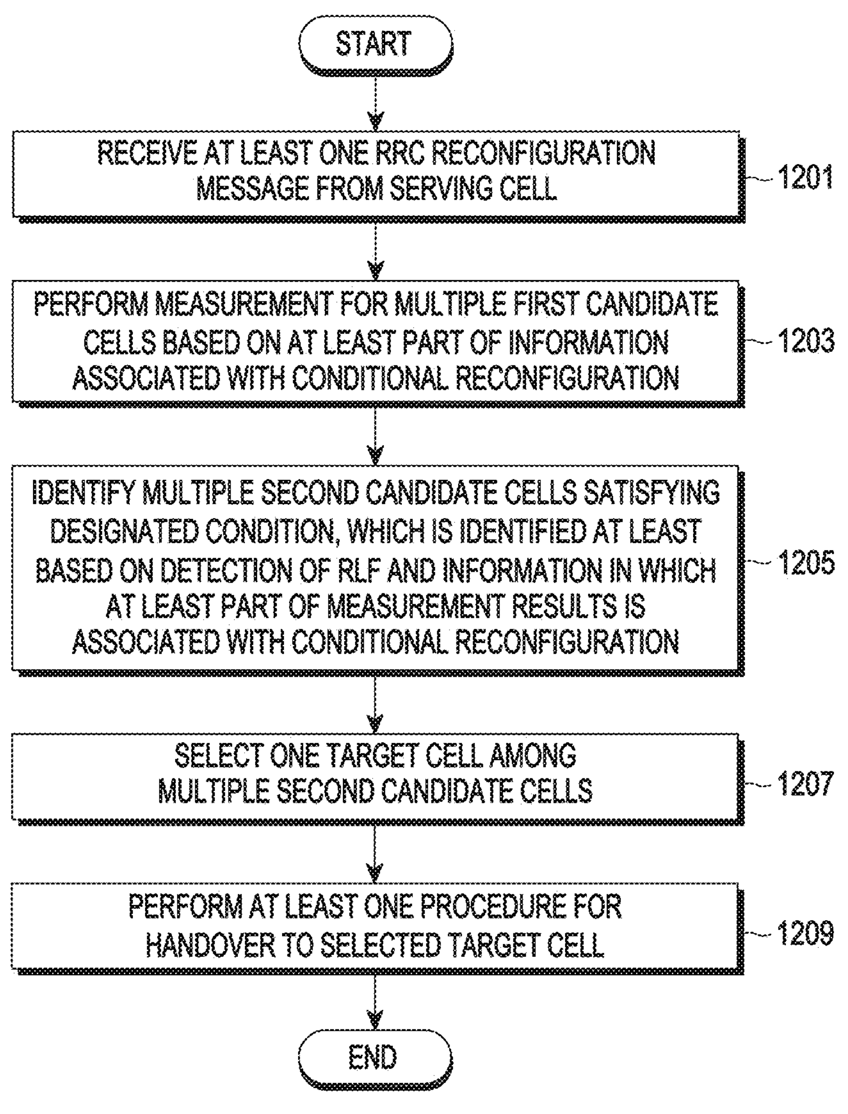
FIG. 12 is a flowchart illustrating an example method of operating an electronic device according to various embodiments.

FIG. 12 is a flowchart illustrating an example method of operating an electronic device according to various embodiments.

According to various embodiments, the electronic device 101 (e.g., at least one of the processor 120, the first communication processor 212, the second communication processor 214, or the integrated communication processor 260) may receive at least one RRC reconfiguration message from a serving cell in operation 1201. The electronic device 101 may measure at least one candidate cell based on at least a part of information associated with conditional reconfiguration identified based on at least one RRC reconfiguration message, in operation 1203. As described above, after performing MR, the electronic device 101 may receive at least one RRC reconfiguration message for conditional reconfiguration from the serving cell 301. The electronic device 101 may identify information associated with conditional reconfiguration based on at least one RRC reconfiguration message received before and/or after performing MR.

According to various embodiments, in operation 1205, the electronic device 101 may identify multiple second candidate cells satisfying a designated condition, which is identified at least based on detection of RLF and information in which at least some of measurement results are associated with a conditional reconfiguration. The electronic device 101 may determine whether at least one designated condition is satisfied, having been described based on at least one of the various embodiments described above. The electronic device 101 may identify a plurality of second candidate cells that satisfy at least one designated condition.

According to various embodiments, in operation 1207, the electronic device 101 may select one target cell from among the plurality of second candidate cells. In operation 1209, the electronic device 101 may perform at least one procedure for handover to the selected target cell. In an example, the electronic device 101 may perform at least one procedure for handover to a candidate cell corresponding to the highest reception strength among measurement results for each of the plurality of second candidate cells that satisfy at least one designated condition. In another example, the electronic device 101 may select one target cell from among the plurality of second candidate cells based on a priority between designated conditions. For example, the electronic device 101 may configure, as a first designated condition, maintaining satisfaction of an execution condition until RLF occurs. For example, the electronic device 101 may configure, as a second designated condition, satisfaction of the execution condition during the adjusted TTT or more. For example, the electronic device 101 may configure satisfaction of the relaxed execution condition during TTT or more as a third designated condition. For example, the electronic device 101 may configure satisfaction of a relaxed execution condition during adjusted TTT or more as the fourth designated condition. For example, the electronic device 101 may configure satisfaction of a strict execution condition as a fifth designated condition. The electronic device 101 may assign a priority to each of the first to fifth designated conditions. Priorities may be pre-configured or may be changed. When a plurality of designated conditions are satisfied, the electronic device 101 may select a designated condition having a relatively higher priority among the designated conditions. The electronic device 101 may perform at least one procedure for handover to a target cell having a selected designated condition. Meanwhile, the electronic device 101 may identify a plurality of candidate cells that satisfy one designated condition. In this case, the electronic device 101 may select a target cell having the highest reception strength among the reception strengths of each of the plurality of candidate cells.

For example, the electronic device 101 may identify satisfied designated conditions and measurement results for each candidate cell as shown in Table 3.

TABLE 3

| Candidate cell | Satisfied condition | Measurement result (RSRP, dBm) |
|---|---|---|
| First candidate cell | First designated condition | −85 |
| Second candidate cell | First designated condition | −75 |
| Third candidate cell | Second designated condition | −70 |
| Fourth candidate cell | Third designated condition | −80 |

In case that the electronic device 101 selects a target cell based only on the measurement result without considering the type of satisfied condition, the electronic device may assign a priority in the order of the third candidate cell, the second candidate cell, the fourth candidate cell, and the first candidate, and accordingly, the third candidate cell may be selected as a target cell. The electronic device 101 may assign a relatively higher priority to a relatively greater reception strength.

The electronic device 101 may assign (or manage) a priority to the first designated condition, the second designated condition, and the third designated condition in the order described. In this case, the electronic device 101 may assign relatively high priorities to the first candidate cell and the second candidate cell that satisfy the first designated condition of the highest priority. In addition, among the first candidate cells and the second candidate cells, the electronic device 101 may assign a higher priority to the first candidate cell having a greater reception strength. Accordingly, the electronic device 101 may assign a priority to the first candidate cell, the second candidate cell, the third candidate cell, and the fourth candidate cell in the order described, and accordingly, the first candidate cell may be selected as a target cell.

Figure 13:
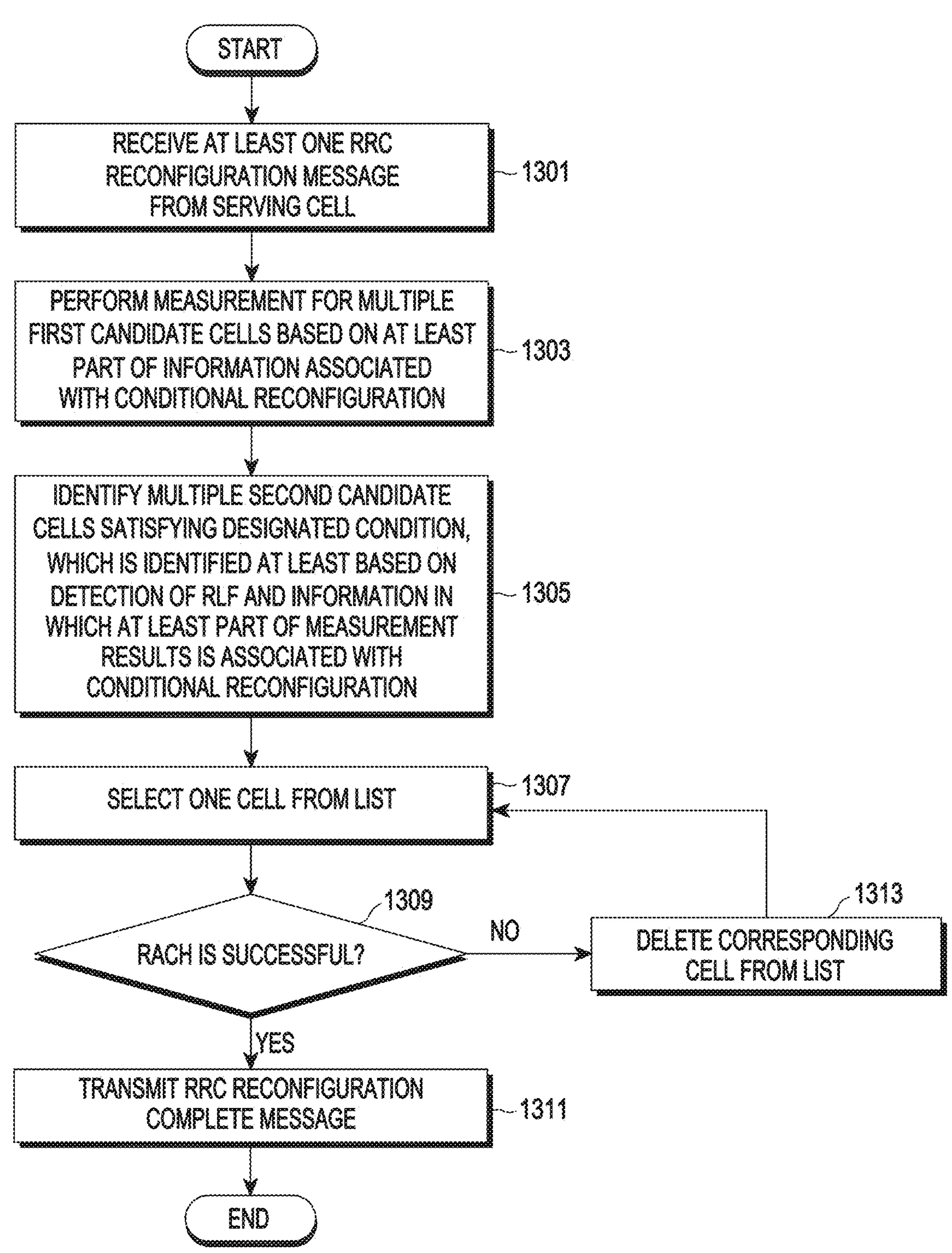
FIG. 13 is a flowchart illustrating an example method of operating an electronic device according to various embodiments.

FIG. 13 is a flowchart illustrating an example method of operating an electronic device according to various embodiments.

According to various embodiments, the electronic device 101 (e.g., at least one of the processor 120, the first communication processor 212, the second communication processor 214, or the integrated communication processor 260) may receive at least one RRC reconfiguration message from a serving cell in operation 1301. The electronic device 101 may measure a plurality of first candidate cells based on at least a part of information associated with conditional reconfiguration identified based on at least one RRC reconfiguration message, in operation 1303. In operation 1305, the electronic device 101 may identify a list of a plurality of second candidate cells satisfying a designated condition, which is identified at least based on detection of RLF and information in which at least part of measurement results is associated with a conditional reconfiguration. For example, as described with reference to FIG. 12, the electronic device 101 may identify a plurality of second candidate cells that satisfy at least one designated condition.

According to various embodiments, in operation 1307, the electronic device 101 may select one cell from the list. As described with reference to FIG. 12, the electronic device 101 may identify priorities of a plurality of candidate cells. For example, the electronic device 101 may identify the priorities of the plurality of candidate cells based only on the reception strength of each of the plurality of candidate cells. Alternatively, the electronic device 101 may identify priorities of a plurality of candidate cells based on the reception strengths of each of the plurality of candidate cells and priorities of designated conditions satisfied by the candidate cells. In operation 1309, the electronic device 101 may determine whether a RACH procedure for the selected candidate cell is successful. In case that the RACH procedure is successful ("Yes" in operation 1309), the electronic device 101 may transmit an RRC reconfiguration complete message to the corresponding cell in operation 1311. In case that the RACH procedure fails ("No" in operation 1309), the electronic device 101 may delete the corresponding cell from the list in operation 1313. The electronic device 101 may select one candidate cell again from the list. For example, the electronic device 101 may select a cell having the highest priority from a list from which a specific cell is deleted and perform the RACH procedure therefor again.

Figure 14A:
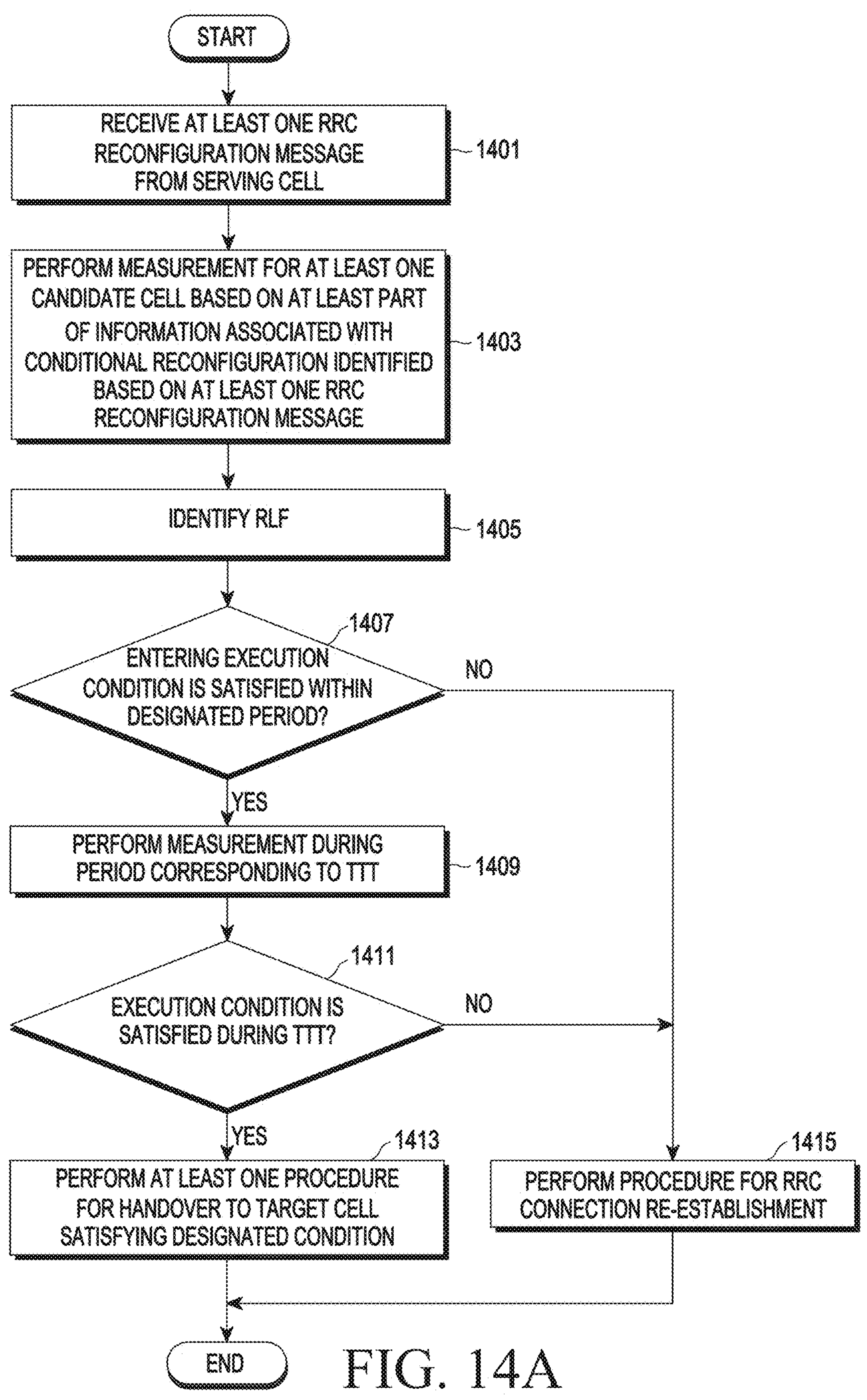
FIG. 14A is a flowchart illustrating an example method of operating an electronic device according to various embodiments.
Figure 14B:
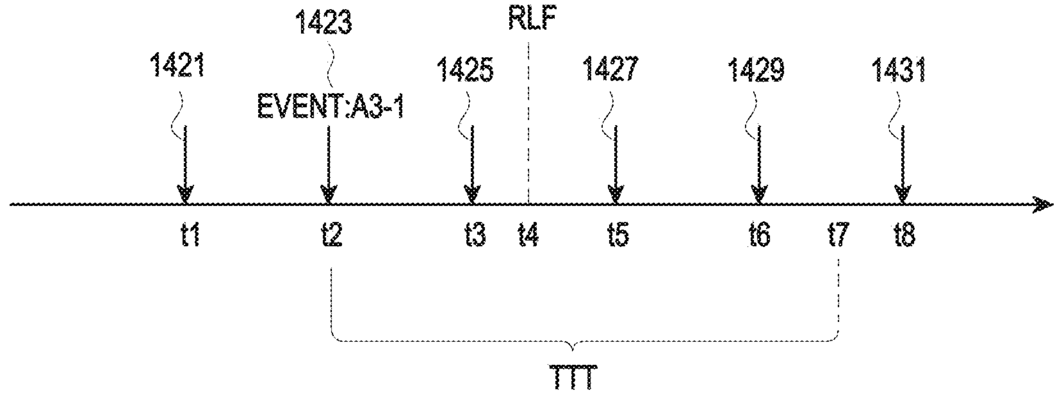
FIG. 14B is a diagram illustrating a measurement result of one measurement object according to various embodiments.

FIG. 14A is a flowchart illustrating an example method of operating an electronic device according to various embodiments. The embodiment of FIG. 14A will be described with reference to FIG. 14B. FIG. 14B is a diagram illustrating a measurement result of any one measurement object according to various embodiments.

According to various embodiments, the electronic device 101 (e.g., at least one of the processor 120, the first communication processor 212, the second communication processor 214, or the integrated communication processor 260) may receive at least one RRC reconfiguration message from a serving cell 301 in operation 1401. The electronic device 101 may measure at least one candidate cell based on at least a part of information associated with conditional reconfiguration identified based on at least one RRC reconfiguration message, in operation 1403. The electronic device 101 may identify the RLF in operation 1405 while performing the measurement. For example, referring to FIG. 14B, the electronic device 101 may identify and/or store measurement results 1421 and 1423 for a specific measurement object at time points t1 and t2. For example, it is assumed that the measurement result 1421 at time point t1 fails to satisfy an entering execution condition, and the measurement result 1423 at time point t2 satisfies the entering execution condition (e.g., (A3-1) event). Upon satisfaction of the entering execution condition, a corresponding TTT (e.g., the TTT of the A3 event) may be initiated. Even thereafter, the electronic device 101 may identify the measurement result 1423 of the corresponding measurement object at time point t3. The electronic device 101 may identify the RLF at time point t4, for example.

According to various embodiments, the electronic device 101 may determine, in operation 1407, whether an entering execution condition is satisfied (or whether a TTT is started) within a designated period from the time point at which the RLF is identified, and there is no limitation to the designated period. For example, in the example of FIG. 14B, the electronic device 101 may identify that the entering execution condition is satisfied (or TTT is started) at time point t2, which is within a designated period from the time point t4 at which RLF is identified. In case that the entering execution condition is satisfied within a designated period ("Yes" in operation 1407), the electronic device 101 may not immediately perform (or may defer) an operation (e.g., RRC connection re-establishment procedure, MCG failure message transmission, or SCG failure message) in response to the RLF, and may wait until the TTT expires. In operation 1409, the electronic device 101 may measure the corresponding measurement object during a period corresponding to the TTT. For example, as in the example of FIG. 14B, the electronic device 101 may identify and/or store measurement results 1427 and 1429 even after the time point t4 at which the RLF is identified. The electronic device 101 may perform measurements according to a measurement gap during a TTT period (or until time point t7 at which the TTT has elapsed) from the time point at which the first entering execution condition is satisfied (e.g., t2 in FIG. 14B), for example. In operation 1411, the electronic device 101 may determine whether the execution condition is satisfied during the TTT. For example, in the example of FIG. 14B, the electronic device 101 may determine whether the measurement results 1425, 1427, and 1429 fail to satisfy a leaving execution condition. In case that the execution condition is satisfied during the TTT ("Yes" in operation 1411), the electronic device 101 may perform at least one procedure for handover to a target cell satisfying the execution condition in operation 1413. For example, when the measurement results 1425, 1427, and 1429 fail to satisfy the leaving execution condition, the electronic device 101 may perform at least one procedure for handover to a target cell that satisfies the execution condition. In case that the entering execution condition is not satisfied within a designated period ("No" in operation 1407) or the execution condition is not satisfied during the TTT ("No" in operation 1411), the electronic device 101 may perform a procedure for RRC connection re-establishment in operation 1415. For example, the electronic device 101 may perform cell search and/or cell selection and perform a procedure for RRC connection re-establishment. Alternatively, the electronic device 101 may transmit an MCG failure message or an SCG failure message. Meanwhile, when it is identified that the leaving condition is satisfied while waiting until the TTT, the electronic device 101 may immediately perform an operation corresponding to the RLF that had been deferred. Meanwhile, although the measurement result 1431 is identified even after the TTT in FIG. 14B, this is an example and the measurement result 1431 thereafter may not be measured.

According to various example embodiments, an electronic device may include memory storing instructions and at least one processor (e.g., at least one of the processor 120, the first communication processor 212, the second communication processor 214, or the unified communication processor 260), wherein the instructions, that when executed by at least one processor, cause the electronic device to: receive at least one radio resource control (RRC) reconfiguration message from a serving cell, perform measurement for at least one neighboring cell based on information associated with conditional reconfiguration identified based on the at least one RRC reconfiguration message, and perform, based on a radio link failure with the serving cell being detected and at least a part of the measurement result for the at least one neighboring cell satisfying a designated condition identified based on the information associated with the conditional reconfiguration, at least one procedure for handover to a target cell satisfying the designated condition.

According to various example embodiments, the instructions, that when executed by at least one processor, may cause the electronic device to, as at least part of the performing at least one procedure for handover to the target cell satisfying the designated condition: identify that at least some of measurement results for the target cell satisfy an execution condition identified based on the information associated with the conditional reconfiguration, and based on identifying that at least one measurement result for the target cell before the time point of detection of the radio link failure after satisfaction of the execution condition has satisfied the execution condition, identify that the target cell has satisfied the designated condition.

According to various example embodiments, the instructions, that when executed by at least one processor, may cause the electronic device to, as at least part of the identifying that at least some of the measurement results for the target cell satisfy the execution condition identified based on the information associated with the conditional reconfiguration: identify that at least some of the measurement results for the target cell satisfy an entering execution condition identified based on the information associated with the conditional reconfiguration, and as at least part of the identifying that the target cell has satisfied the designated condition based on identifying that at least one measurement result for the target cell before the time point of detection of the radio link failure after satisfaction of the execution condition has satisfied the execution condition: identify that the target cell has satisfied the designated condition, based on identifying that at least one measurement results for the target cell before the time point of detection of the radio link failure after satisfaction of the entering execution condition fails to satisfy a leaving execution condition identified based on the information associated with the conditional reconfiguration, wherein a period before the time point of detection of the radio link failure after satisfaction of the entering execution condition is shorter than a time to trigger identified based on the information associated with the conditional reconfiguration.

According to various example embodiments, the instructions, that when executed by at least one processor, may cause the electronic device to, as at least part of the performing at least one procedure for handover to the target cell satisfying the designated condition: identify that at least some of the measurement results for the target cell satisfy an execution condition identified based on the information associated with the conditional reconfiguration, and based on identifying at least one measurement result for the target cell before the time point of detection of the radio link failure after satisfaction of the entering execution condition is satisfying the execution condition during a period corresponding to a value obtained by adjusting a time to trigger identified based on the information associated with the conditional reconfiguration, identify that the target cell has satisfied the designated condition.

According to various example embodiments, the instructions, that when executed by at least one processor, may cause the electronic device to, as at least part of the identifying that at least some of the measurement results for the target cell satisfy the execution condition identified based on the information associated with the conditional reconfiguration: identify that at least some of the measurement results for the target cell satisfy an entering execution condition identified based on the information associated with the conditional reconfiguration, and as at least part of the identifying that the target cell has satisfied the designated condition, based on identifying at least one measurement result for the target cell before the time point of detection of the radio link failure after satisfaction of the execution condition satisfying the execution condition during a period corresponding to a value obtained by adjusting the time to trigger identified based on the information associated with the conditional reconfiguration: identify that the target cell has satisfied the designated condition, based on identifying that a period, in which at least a part of at least one measurement result for the target cell before the time point of detection of the radio link failure after satisfaction of the entering execution condition fails to satisfy a leaving execution condition identified based on the information associated with the conditional reconfiguration, is equal to or longer than the value obtained by adjusting the time to trigger, wherein the obtained value is less than that of the time to trigger.

According to various example embodiments, the instructions, that when executed by at least one processor, may cause the electronic device to, as at least part of the performing at least one procedure for handover to a target cell satisfying the designated condition: identify an entering condition based on the information associated with the conditional reconfiguration, identify a relaxed entering condition satisfied at a reception strength less than a minimum reception strength for satisfying the execution condition, identify that at least some of the measurement results for the target cell satisfy the relaxed execution condition, and based on identifying at least one measurement result for the target cell before the time point of detection of the radio link failure after satisfaction of the relaxed execution condition satisfying the execution condition during a time to trigger identified based on the information associated with the conditional reconfiguration, identify that the target cell has satisfied the designated condition.

According to various example embodiments, the instructions, that when executed by at least one processor, may cause the electronic device to, as at least part of the identifying that at least some of the measurement results for the target cell satisfy the relaxed execution condition: identify that at least some of the measurement results for the target cell satisfy a relaxed entering execution condition corresponding to an entering execution condition identified based on the information associated with the conditional reconfiguration, wherein a minimum reception strength for satisfying the relaxed entering execution condition is less than a minimum reception strength for satisfying the entering execution condition, and as at least a part of the identifying that the target cell has satisfied the designated condition, based on identifying at least one measurement result for the target cell before the time point of detection of radio link failure after satisfaction of the relaxed execution condition satisfying the execution condition during a time to trigger identified based on the information associated with the conditional reconfiguration: identify that the target cell has satisfied the designated condition, based on a period, in which at least a part of the at least one measurement result for the target cell before the time point of detection of the radio link failure after satisfaction of the relaxed entering execution condition failing to satisfy a relaxed leaving execution condition corresponding to a leaving execution condition identified based on the information associated with the conditional reconfiguration, is equal to or longer than the time to trigger, wherein a minimum reception strength failing to satisfy the relaxed entering execution condition is less than a minimum reception strength for satisfying the leaving execution condition.

According to various example embodiments, the instructions, that when executed by at least one processor, may cause the electronic device to, as at least part of the performing at least one procedure for handover to the target cell satisfying the designated condition: identify an entering condition based on the information associated with the conditional reconfiguration, identify a relaxed entering condition satisfied at a reception strength less than a minimum reception strength for satisfying the execution condition, identify that at least some of the measurement results for the target cell satisfy the relaxed execution condition, and based on identifying at least one measurement result for the target cell before the time point of detection of the radio link failure after satisfaction of the relaxed execution condition satisfying the execution condition during a time to trigger identified based on the information associated with the conditional reconfiguration, identify that the target cell has satisfied the designated condition.

According to various example embodiments, the instructions, that when executed by at least one processor, may cause the electronic device to, as at least part of the identifying that at least some of the measurement results for the target cell satisfy the relaxed execution condition: identify that at least some of the measurement results for the target cell satisfy a relaxed entering execution condition corresponding to an entering execution condition identified based on the information associated with the conditional reconfiguration, wherein a minimum reception strength for satisfying the relaxed entering execution condition is less than a minimum reception strength for satisfying the entering execution condition, and as at least part of the identifying that the target cell has satisfied the designated condition, based on identifying that at least one measurement result for the target cell before the time point of detection of the radio link failure after the satisfaction of the relaxed entering execution condition is satisfied during a period corresponding to a value obtained by adjusting a time to trigger identified based on the information associated with the conditional reconfiguration: identify that the target cell has satisfied the designated condition, based on a period, in which at least a part of the at least one measurement result for the target cell before the time point of detection of the radio link failure after the satisfaction of the relaxed entering execution condition failing to satisfy a relaxed leaving execution condition corresponding to a leaving execution condition identified based on the information associated with the conditional reconfiguration, is equal to or longer than a value obtained by adjusting the time to trigger, wherein a minimum reception strength for failing to satisfy the relaxed entering execution condition is less than a minimum reception strength for satisfying the leaving execution condition, and the value obtained by adjusting the time to trigger is less than that of the time to trigger.

According to various example embodiments, the instructions, that when executed by at least one processor, may cause the electronic device to, as at least part of the performing at least one procedure for handover to the target cell satisfying the designated condition: identify an entering condition and a strict entering condition corresponding to the entering condition based on the information associated with the conditional reconfiguration, wherein a minimum reception strength for satisfying the strict entering condition is greater than a minimum reception strength for satisfying the execution condition, and identify that the target cell has satisfied the designated condition, based on identifying that at least some of the measurement results for the target cell satisfy the strict execution condition.

According to various example embodiments, the instructions, that when executed by at least one processor, may cause the electronic device to, as at least part of the performing at least one procedure for handover to a target cell satisfying the designated condition: identify that the execution condition is satisfied, based on at least one measurement result satisfying an execution condition identified based on the information associated with the conditional reconfiguration exists among at least one measurement result for the target cell, measured during a designated period before the detection of the radio link failure.

According to various example embodiments, one or more of the at least one processor may be configured to, as at least part of the performing at least one procedure for handover to a target cell satisfying the designated condition: identify that the execution condition is satisfied, based on a plurality of the measurement results satisfying an execution condition identified based on the information associated with the conditional reconfiguration exist among at least one measurement result for the target cell measured during a designated period before the detection of the radio link failure.

According to various example embodiments, the instructions, that when executed by at least one processor, may cause the electronic device to, as at least part of the performing at least one procedure for handover to a target cell satisfying the designated condition: identify that the execution condition is satisfied, based on a designated number or more of the measurement results satisfying an execution condition identified based on the information associated with the conditional reconfiguration exist among at least one measurement result for the target cell measured during a designated period before the detection of the radio link failure.

According to various example embodiments, the instructions, that when executed by at least one processor, may cause the electronic device to, as at least part of the performing at least one procedure for handover to a target cell satisfying the designated condition: identify a plurality of candidate cells satisfying the designated condition, and select the target cell from among the plurality of candidate cells.

According to various example embodiments, the instructions, that when executed by at least one processor, may cause the electronic device to, as at least part of the selecting of the target cell from among the plurality of candidate cells: select a first candidate cell having the highest reception strength among the plurality of candidate cells, as the target cell.

According to various example embodiments, the instructions, that when executed by at least one processor, may cause the electronic device to, as at least part of the selecting of the target cell from among the plurality of candidate cells: perform a random access channel (RACH) procedure for the first candidate cell having the highest reception strength among the plurality of candidate cells, and based on the failure of the RACH procedure, select a second candidate cell having a reception strength, next highest to that of the first candidate cell from among the plurality of candidate cells.

According to various example embodiments, the instructions, that when executed by at least one processor, may cause the electronic device to, as at least part of the performing at least one procedure for handover to a target cell satisfying the designated condition: identify at least one first candidate cell satisfying a first designated condition, and at least one second candidate cell satisfying a second designated condition different from the first designated condition, and select one candidate cell among the at least one first candidate cell and the at least one second candidate cell as the target cell, based on a priority of each of the first designated condition and the second designated condition.

According to various example embodiments, the instructions, that when executed by at least one processor, may cause the electronic device to, as at least part of the selecting one candidate cell among the at least one first candidate cell and the at least one second candidate cell as the target cell, based on a priority of each of the first designated condition and the second designated condition: select the at least one first candidate cell based on a priority of the first designated condition being higher than a priority of the second designated condition, and select the first candidate cell having the highest reception strength among the first candidate cells as the target cell.

According to various example embodiments, an electronic device may include memory storing instructions and at least one processor, wherein the instructions, that when executed by at least one processor, cause the electronic device, while being connected to a serving cell of a first radio access technology (RAT) and a PSCell of a second RAT different from the first RAT, to: receive at least one radio resource control (RRC) reconfiguration message from the serving cell, perform measurement for at least one neighboring cell based on information associated with conditional reconfiguration identified based on the at least one RRC reconfiguration message, and perform, based on a radio link failure with the PSCell being detected and at least a part of the measurement result for the at least one neighboring cell satisfying a designated condition identified based on the information associated with the conditional reconfiguration, at least one procedure for handover to a target cell satisfying the designated condition.

According to various example embodiments, an electronic device may include memory storing instructions and at least one processor, wherein the instructions, that when executed by at least one processor, cause the electronic device to: receive at least one radio resource control (RRC) reconfiguration message from a serving cell, perform measurement for at least one neighboring cell based on information associated with conditional reconfiguration identified based on the at least one RRC reconfiguration message, identify that a first measurement result for a target cell among the measurement results for the at least one neighboring cell satisfies an entering execution condition identified based on the information associated with the conditional reconfiguration, identify that, before the elapse of a time to trigger, identified based on the information associated with the conditional reconfiguration, at least one second measurement result after the first measurement result fails to satisfy a leaving execution condition identified based on the information associated with the conditional reconfiguration, detect a radio link failure to the serving cell before the time to trigger elapses, identify at least one third measurement result while deferring performance of an operation corresponding to the radio link failure until the time to trigger has elapsed from the time point of measurement of the first measurement result, perform at least one procedure for handover to the target cell, based on the at least one third measurement result failing to satisfy the leaving execution condition, and perform an operation corresponding to the radio link failure based on at least a part of the at least one third measurement result satisfying the leaving execution condition.

According to an example embodiment, a method of operating an electronic device may comprise: receiving at least one radio resource control (RRC) reconfiguration message from a serving cell, performing measurement for at least one neighboring cell based on information associated with a conditional reconfiguration identified based on the at least one RRC reconfiguration message, and performing, based on a radio link failure with the serving cell being detected and at least part of measurement result for the at least one neighboring cell satisfying a designated condition identified based on the information associated with the conditional reconfiguration, at least one procedure for handover to a target cell satisfying the designated condition.

According to an example embodiment, a computer-readable storage medium storing instructions, wherein the instructions, when executed by at least one processor of an electronic device, cause the electronic device to perform operations comprising: receiving at least one radio resource control (RRC) reconfiguration message from a serving cell, performing measurement for at least one neighboring cell based on information associated with a conditional reconfiguration identified based on the at least one RRC reconfiguration message, and performing, based on a radio link failure with the serving cell being detected and at least part of measurement result for the at least one neighboring cell satisfying a designated condition identified based on the information associated with the conditional reconfiguration, at least one procedure for handover to a target cell satisfying the designated condition.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as “A or B,” “at least one of A and B,” “at least one of A or B,” “A, B, or C,” “at least one of A, B, and C,” and “at least one of A, B, or C,” may include any one of, or all possible combinations of the items enumerated together in a corresponding one of the phrases. As used herein, such terms as “1st” and “2nd,” or “first” and “second” may be used to simply distinguish a corresponding component from another, and does not limit the components in other aspect (e.g., importance or order). It is to be understood that if an element (e.g., a first element) is referred to, with or without the term “operatively” or “communicatively”, as “coupled with,” “coupled to,” “connected with,” or “connected to” another element (e.g., a second element), the element may be coupled with the other element directly (e.g., wiredly), wirelessly, or via a third element.

As used in connection with various embodiments of the disclosure, the term “module” may include a unit implemented in hardware, software, or firmware, or any combination thereof, and may interchangeably be used with other terms, for example, “logic,” “logic block,” “part,” or “circuitry”. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the “non-transitory” storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:

memory storing instructions; and at least one processor comprising processing circuitry, wherein the instructions, that when executed by the at least one processor individually or collectively, cause the electronic device to:

receive, from a serving cell, at least one radio resource control (RRC) reconfiguration message including conditional reconfiguration information, based on the conditional reconfiguration information, perform measurement for at least one neighboring cell, when a result of the measurement for the at least one neighboring cell satisfies an execution condition identified by the conditional reconfiguration information, initiate a time to trigger (TTT) identified by the conditional reconfiguration information, wherein the TTT defines a time period during which the execution condition is to be satisfied in order to perform a procedure for a handover operation to a target cell, in case that a radio link failure associated with the serving cell is detected before the TTT expires, perform the at least one procedure for the handover operation to the target cell regardless of an expiration of the TTT, wherein the target cell is identified based on the result of the measurements and the target cell satisfying the execution condition.

2. The electronic device of claim 1, wherein the instructions, that when executed by at least one processor, cause the electronic device to:

identify that at least some of the measurement results for the target cell satisfy an entering execution condition identified based on the information associated with the conditional reconfiguration, identify that the target cell has satisfied the designated condition, based on identifying that at least one measurement result for the target cell before the time point of detection of the radio link failure after satisfaction of the entering execution condition fails to satisfy a leaving execution condition identified based on the information associated with the conditional reconfiguration, and wherein a period before the time point of detection of the radio link failure after satisfaction of the entering execution condition is shorter than the time to trigger.

3. The electronic device of claim 1, wherein the instructions, that when executed by at least one processor, cause the electronic device to:

based on identifying at least one measurement result for the target cell before the time point of detection of the radio link failure after satisfaction of the entering execution condition satisfying the execution condition during a period corresponding to a value obtained by adjusting thea time to trigger, identify that the target cell has satisfied the designated condition.

4. The electronic device of claim 3, wherein the instructions, that when executed by at least one processor, cause the electronic device to:

based on identifying at least one measurement result for the target cell before the time point of detection of the radio link failure after satisfaction of the execution condition during a period corresponding to a value obtained by adjusting the time to trigger, identify that the target cell has satisfied the designated condition, based on identifying that a period, in which at least a part of at least one measurement result for the target cell before the time point of detection of the radio link failure after satisfaction of the entering execution condition fails to satisfy a leaving execution condition identified based on the information associated with the conditional reconfiguration, is equal to or longer than the value obtained by adjusting the time to trigger, and wherein the obtained value is less than the time to trigger.

5. The electronic device of claim 1, wherein the instructions, that when executed by at least one processor, cause the electronic device to:

identify an entering condition based on the information associated with the conditional reconfiguration;

identify a relaxed execution condition satisfied at a reception strength less than a minimum reception strength for satisfying the execution condition;

identify that at least some of the measurement results for the target cell satisfy the relaxed execution condition; and based on identifying at least one measurement result for the target cell before the time point of detection of the radio link failure after satisfaction of the relaxed execution condition during the time to trigger, identify that the target cell has satisfied the designated condition.

6. The electronic device of claim 5, wherein the instructions, that when executed by at least one processor, cause the electronic device to:

identify that at least some of the measurement results for the target cell satisfy a relaxed entering execution condition, wherein a minimum reception strength for satisfying the relaxed entering execution condition is less than a minimum reception strength for satisfying the entering execution condition, and based on identifying at least one measurement result for the target cell before the time point of detection of radio link failure after satisfaction of the relaxed execution condition during the time to trigger, identify that the target cell has satisfied the designated condition, based on a period, in which at least part of the at least one measurement result for the target cell before the time point of detection of the radio link failure after satisfaction of the relaxed entering execution condition fails to satisfy a relaxed leaving execution condition, being equal to or longer than the time to trigger, wherein a minimum reception strength failing to satisfy the relaxed entering execution condition is less than a minimum reception strength for satisfying the leaving execution condition.

7. The electronic device of claim 1, wherein the instructions, that when executed by at least one processor, cause the electronic device to:

identify an entering condition based on the information associated with the conditional reconfiguration;

identify a relaxed execution condition satisfied at a reception strength less than a minimum reception strength for satisfying the execution condition;

identify that at least some of the measurement results for the target cell satisfy the relaxed execution condition; and based on identifying at least one measurement result for the target cell before the time point of detection of the radio link failure after satisfaction of the relaxed execution condition during a period corresponding to a value obtained by adjusting the time to trigger, identify that the target cell has satisfied the designated condition.

8. The electronic device of claim 7, wherein the instructions, that when executed by at least one processor, cause the electronic device to:

identify that at least some of the measurement results for the target cell satisfy a relaxed entering execution condition, wherein a minimum reception strength for satisfying the relaxed entering execution condition is less than a minimum reception strength for satisfying the entering execution condition, and based on identifying that at least one measurement result for the target cell before the time point of detection of the radio link failure after the satisfaction of the relaxed execution condition is satisfied during a period corresponding to a value obtained by adjusting the time to trigger, identify that the target cell has satisfied the designated condition, based on a period, in which at least part of the at least one measurement result for the target cell before the time point of detection of the radio link failure after the satisfaction of the relaxed entering execution condition fails to satisfy a relaxed leaving execution condition, being equal to or longer than a value obtained by adjusting the time to trigger, wherein a minimum reception strength for failing to satisfy the relaxed leaving execution condition is less than a minimum reception strength for satisfying the leaving execution condition, and the obtained value is less than the time to trigger.

9. The electronic device of claim 1, wherein the instructions, that when executed by at least one processor, cause the electronic device to:

identify an entering condition and a strict entering condition corresponding to the entering condition based on the information associated with the conditional reconfiguration, wherein a minimum reception strength for satisfying the strict entering condition is greater than a minimum reception strength for satisfying the execution condition; and identify that the target cell has satisfied the designated condition, based on identifying that at least some of the measurement results for the target cell satisfy the strict execution condition.

10. The electronic device of claim 1, wherein the instructions, that when executed by at least one processor, cause the electronic device to:

based on one or more measurement results satisfying an execution condition and measured during a designated period before the detection of the radio link failure, identify that the execution condition is satisfied.

11. The electronic device of claim 1, wherein the instructions, that when executed by at least one processor, cause the electronic device to:

based on a plurality of or a designated number or more of the measurement results satisfying an execution condition measured during a designated period before the detection of the radio link failure, identify that the execution condition is satisfied.

12. The electronic device of claim 1, wherein the instructions, that when executed by at least one processor, cause the electronic device to:

identify a plurality of candidate cells satisfying the designated condition; and select the target cell from among the plurality of candidate cells.

13. The electronic device of claim 12, wherein the instructions, that when executed by at least one processor cause the electronic device to, as at least part of the selecting the target cell from among the plurality of candidate cells:

perform a random access channel (RACH) procedure for the first candidate cell having the highest reception strength from among the plurality of candidate cells; and based on the failure of the RACH procedure, select a second candidate cell having a reception strength, next highest to that of the first candidate cell, from among the plurality of candidate cells.

14. The electronic device of claim 1, wherein the instructions, that when executed by at least one processor cause the electronic device to, as at least part of the performing at least one procedure for handover to a target cell satisfying the designated condition:

identify at least one first candidate cell satisfying a first designated condition, and at least one second candidate cell satisfying a second designated condition different from the first designated condition; and select a candidate cell among the at least one first candidate cell and the at least one second candidate cell as the target cell, based on a priority of each of the first designated condition and the second designated condition.

15. A method of operating an electronic device comprising:

receiving, from a serving cell, at least one radio resource control (RRC) reconfiguration message including conditional reconfiguration information, based on the conditional reconfiguration information, performing measurement for at least one neighboring cell, when a result of the measurements for the at least one neighboring cell satisfies an execution condition identified by the conditional reconfiguration information, initiating a time to trigger (TTT) identified by the conditional reconfiguration information, wherein the TTT defines a time period during which the execution condition is to be satisfied in order to perform a procedure for a handover operation to a target cell, in case that a radio link failure associated with the serving cell is detected before the TTT expires, performing the at least one procedure for the handover operation to thea target cell regardless of an expiration of the TTT, wherein the target cell is identified based on the result of the measurements and the target cell satisfying the execution condition.

16. The method of claim 15, further comprising:

identifying that at least some of the measurement results for the target cell satisfy an entering execution condition identified based on the information associated with the conditional reconfiguration, identifying that the target cell has satisfied the designated condition, based on identifying that at least one measurement result for the target cell before the time point of detection of the radio link failure after satisfaction of the entering execution condition fails to satisfy a leaving execution condition identified based on the information associated with the conditional reconfiguration, and wherein a period before the time point of detection of the radio link failure after satisfaction of the entering execution condition is shorter than the time to trigger.

17. The method of claim 15, further comprising:

based on identifying at least one measurement result for the target cell before the time point of detection of the radio link failure after satisfaction of the entering execution condition satisfying the execution condition during a period corresponding to a value obtained by adjusting thea time to trigger, identifying that the target cell has satisfied the designated condition.

18. A non-transitory computer-readable storage medium storing instructions, wherein the instructions, when executed by at least one processor of an electronic device, cause the electronic device to perform operations comprising:

receiving, from a serving cell, at least one radio resource control (RRC) reconfiguration message including conditional reconfiguration information;

based on the conditional reconfiguration information, performing measurement for at least one neighboring cell, when a result of the measurements for the at least one neighboring cell satisfies an execution condition identified by the conditional reconfiguration information, initiating a time to trigger (TTT) identified by the conditional reconfiguration information, wherein the TTT defines a time period during which the execution condition is to be satisfied in order to perform a procedure for a handover operation to a target cell, in case that a radio link failure associated with the serving cell is detected before the TTT expires, performing the at least one procedure for the handover operation to thea target cell regardless of an expiration of the TTT, wherein the target cell is identified based on the result of the measurements and the target cell satisfying the execution condition.

* * * * *